US005774873A

United States Patent [19]
Berent et al.

[11] Patent Number: 5,774,873
[45] Date of Patent: Jun. 30, 1998

[54] ELECTRONIC ON-LINE MOTOR VEHICLE AUCTION AND INFORMATION SYSTEM

[75] Inventors: Thomas Gerard Berent; Dennis Wayne Hurst, both of Murfreesboro; Thomas Edward Patton, LaVergne; Ty J. Tabernik, Franklin; Julie Elizabeth Warpool, College Grove; Donald C. Reig, Nashville; William Howard Whittle, Antioch, all of Tenn.

[73] Assignee: ADT Automotive, Inc., Nashville, Tenn.

[21] Appl. No.: 626,211

[22] Filed: Mar. 29, 1996

[51] Int. Cl.⁶ .................................................. G06F 17/60
[52] U.S. Cl. ................................................ 705/26; 705/27
[58] Field of Search ................................. 395/226, 227, 395/237, 610; 705/26, 27, 28, 37

[56] References Cited

U.S. PATENT DOCUMENTS

| | | | |
|---|---|---|---|
| 3,581,072 | 5/1971 | Nymeyer | 395/237 |
| 3,656,148 | 4/1972 | Belcher et al. | 345/2 |
| 4,789,928 | 12/1988 | Fujisaki | 395/237 |
| 4,799,156 | 1/1989 | Shavit et al. | 705/26 |
| 4,992,940 | 2/1991 | Dworkin | 395/226 |
| 5,347,306 | 9/1994 | Nitta | 348/15 |
| 5,394,324 | 2/1995 | Clearwater | 395/208 |

OTHER PUBLICATIONS

Dr. Link, Manning and Napier Information Services, Nov. 11, 1997.

Ellen Messmer, Car auctions via Business TV to debut, Network World Jul. 25, 1994.

David Hulme, Car Auctions by Satellite, Asian Business, p. 16 Nov. 1994.

Gabriella Stern, Sold! Big used car auctions, The Wall Street Journal Jun. 27, 1995.

*Primary Examiner*—Edward R. Cosimano
*Assistant Examiner*—Barton L. Bainbridge
*Attorney, Agent, or Firm*—Waddey & Patterson, P.C.; Mark J. Patterson

[57] ABSTRACT

An electronic auction and motor vehicle auction information system allows remote users to interactively participate in motor vehicle auction sales of motor vehicles using a personal computer. Additional user applications associated with the system permit users to access and search a system database and display data about motor vehicle auction dates and locations, vehicle inventory, industry news, and vehicle sales history.

10 Claims, 28 Drawing Sheets

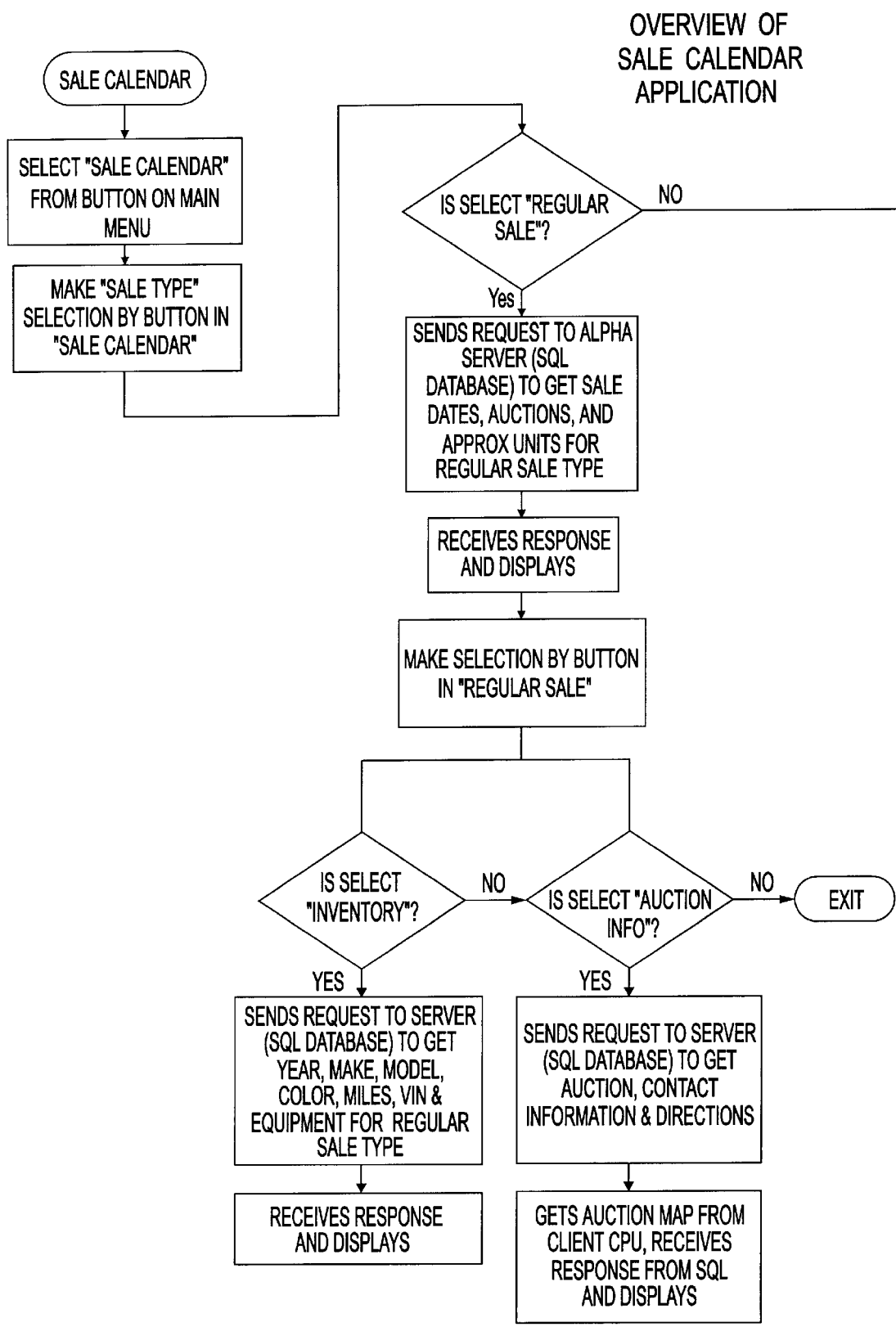
FIG. 2A1

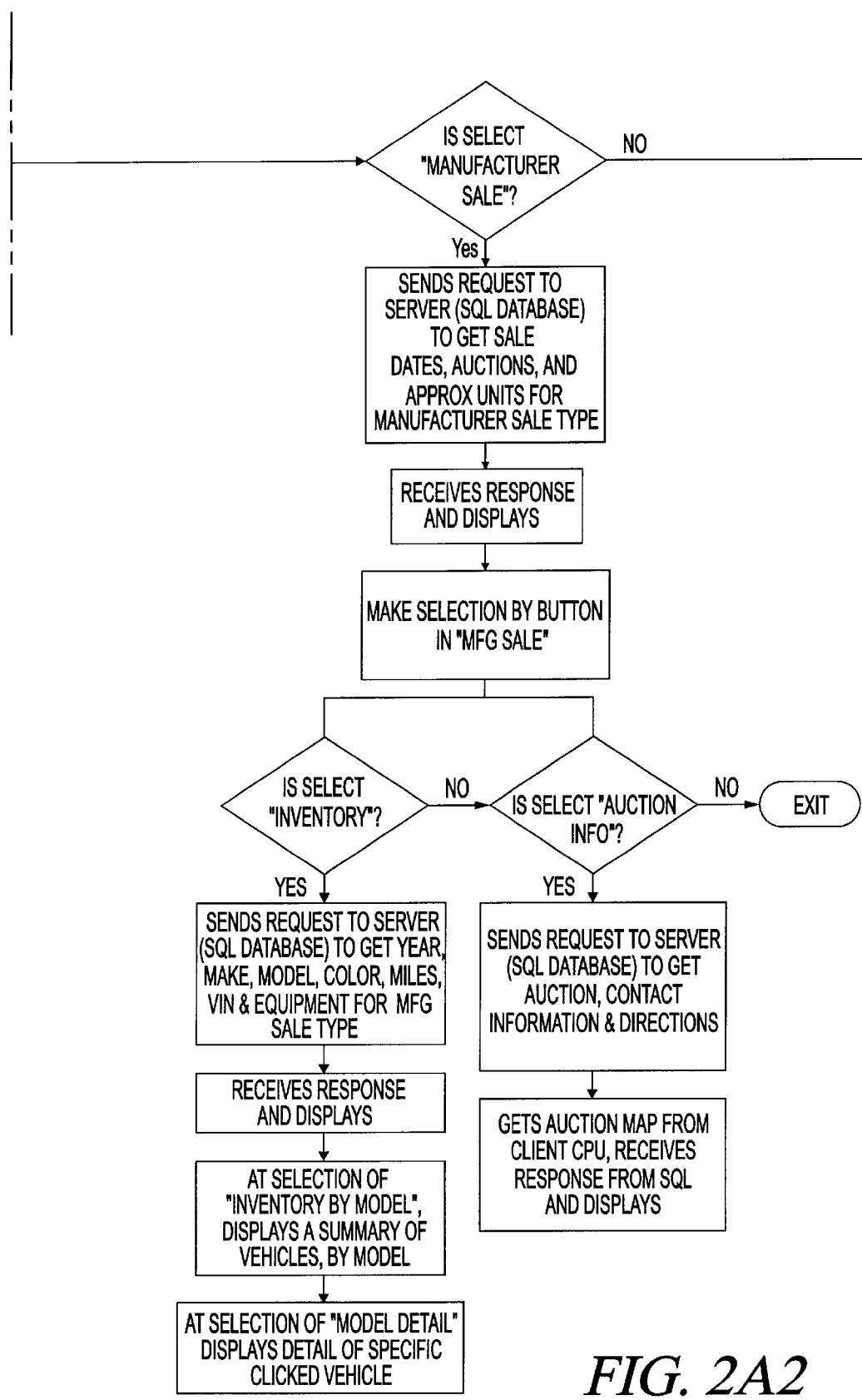
FIG. 2A2

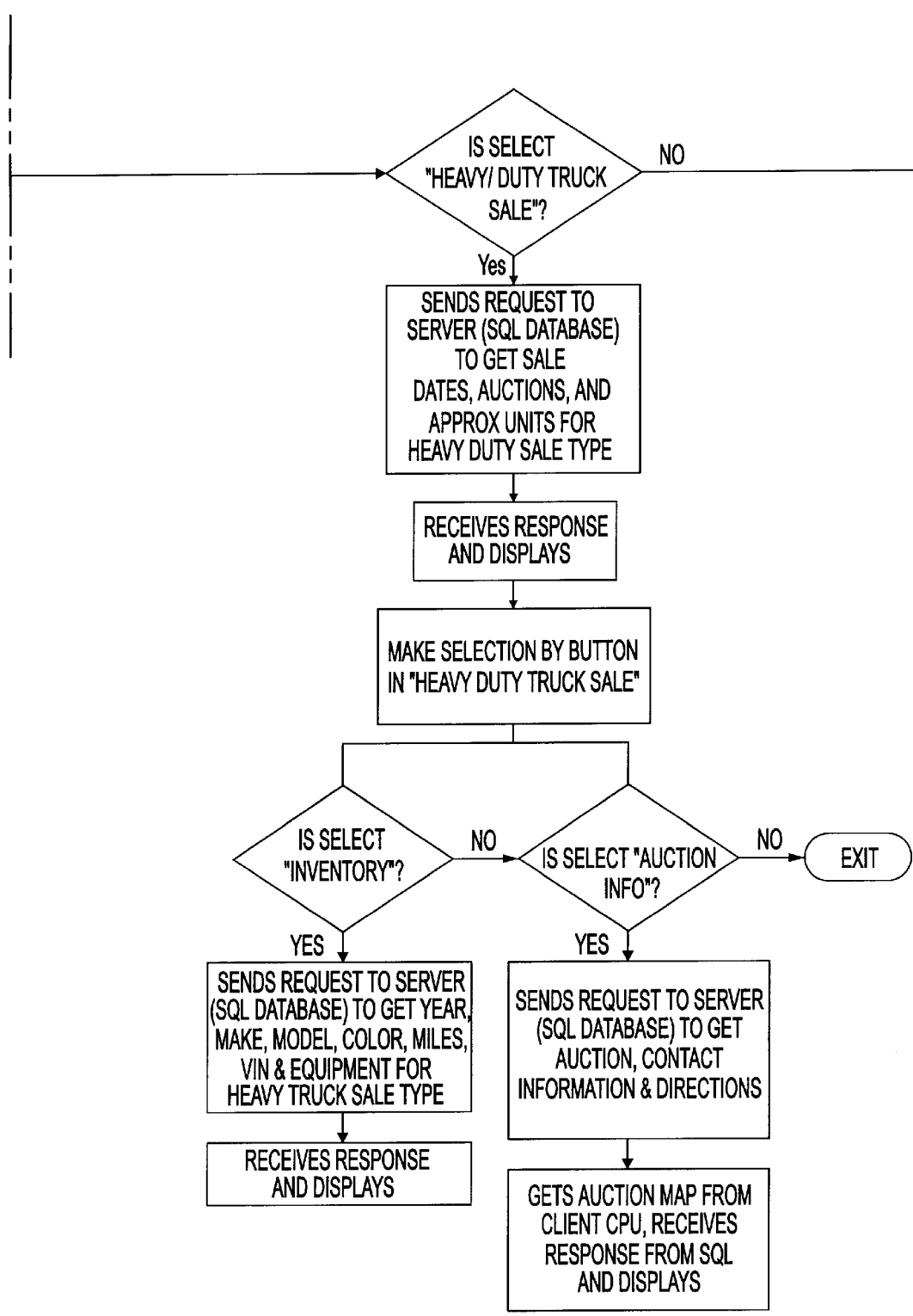
FIG. 2A3

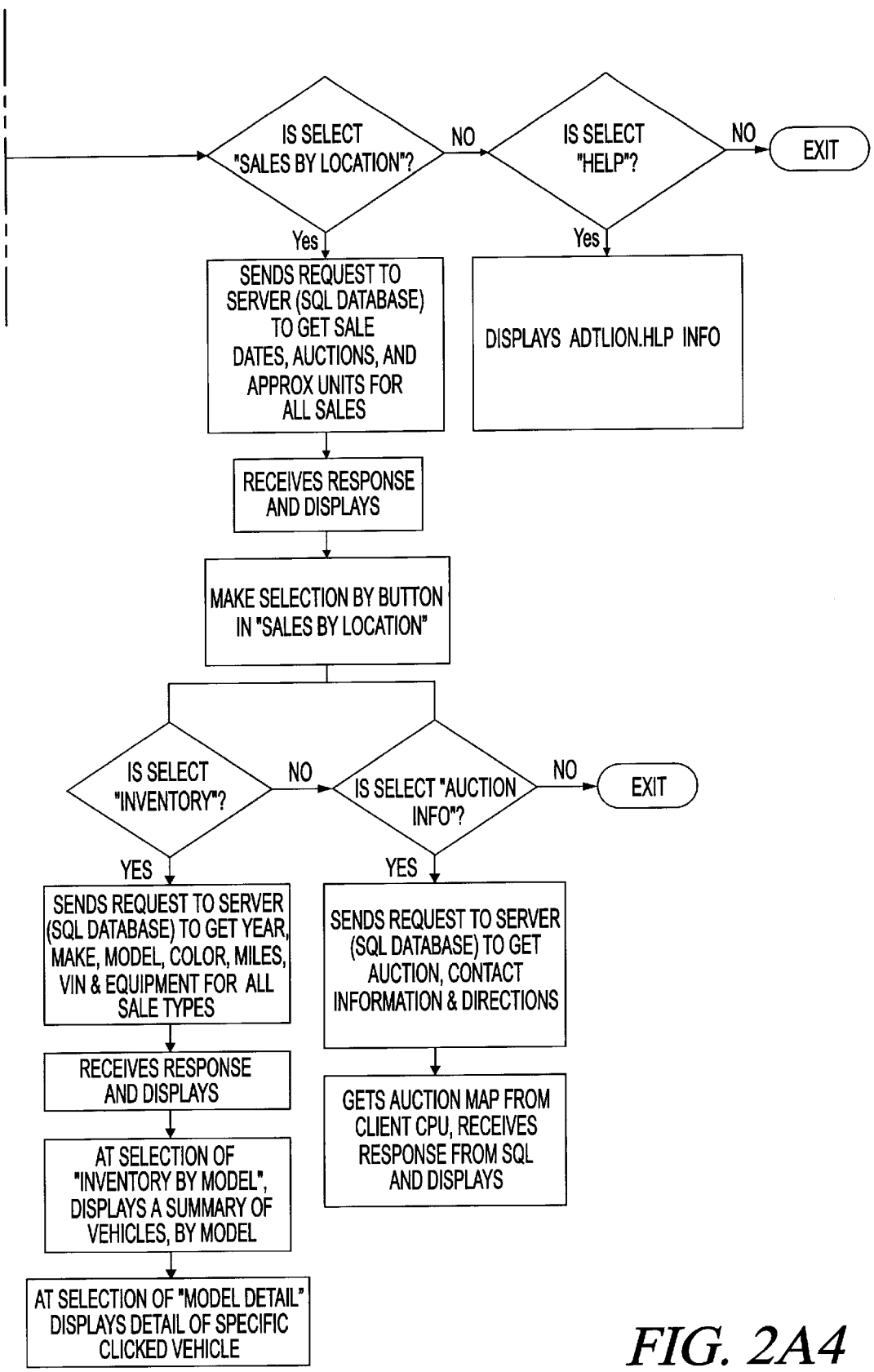
FIG. 2A4

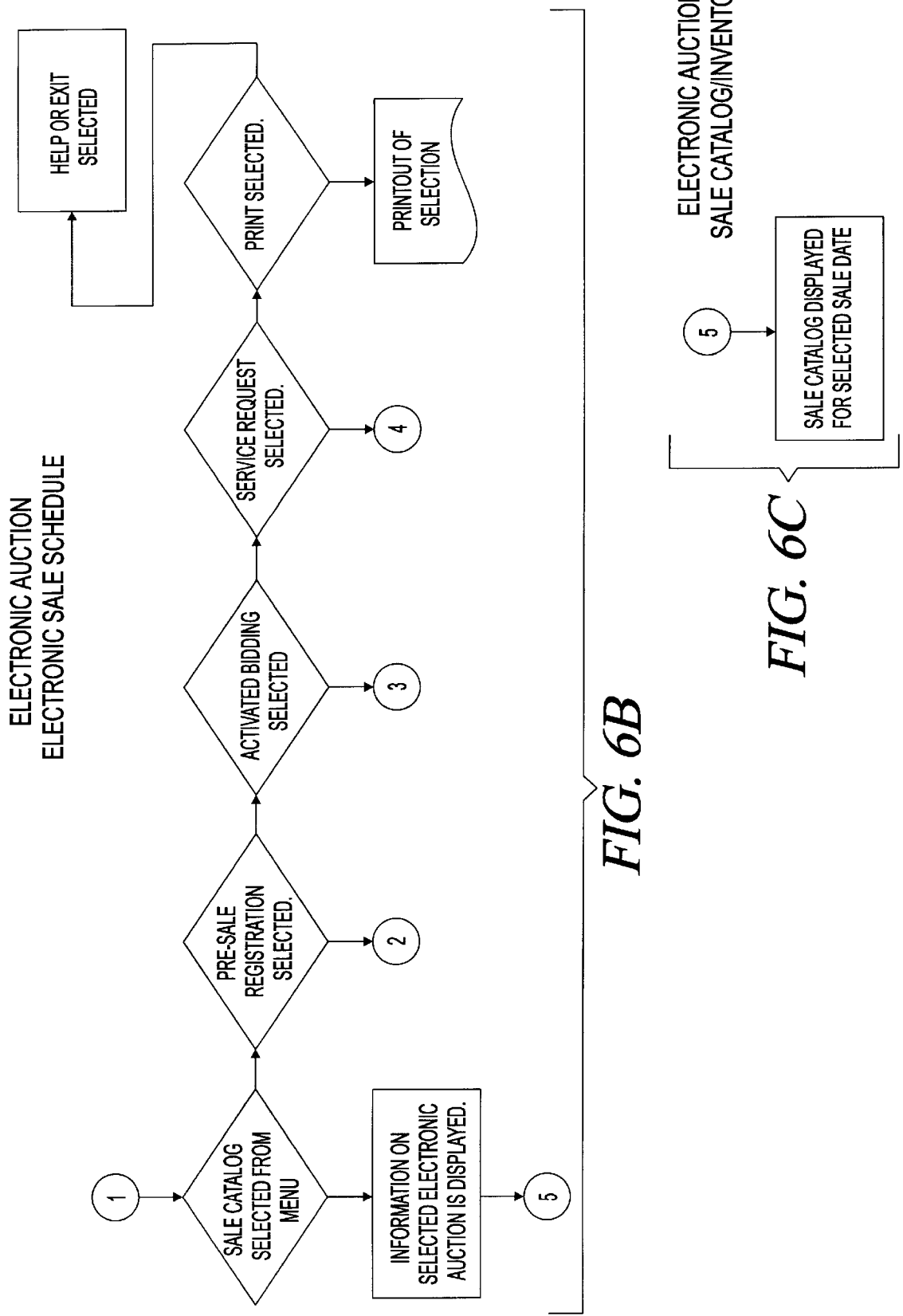

Date: 7/2/95 8:59 pm
Project: ADT LION
ADT Automotive
Form_Load (cont'd)

SAMPLE SOURCE CODE
SALE CALENDAR - SCHEDULE FORM LOAD
C:\ADT\SCHEDULE.FRM

```
    Dim sSaleTime As String * 5
    Dim sAMPM As String * 2
    Dim sMfg As String * 25
    Dim sLoc As String * 40
    Dim sUnitsOffered As String * 5
    sSaleDate = " "
    sSaleTime = " "
    sAMPM = " "
    sUnitsOffered = " "
    Dim i
    i = 1

' Execute the given query, using the given hStmt,
' If an error occurs, nothing happens Dim 1x As Long
Dim CountQry As String
```

*FIG. 8A*

```
If selectedsaletype = 0 Then ' This is regular sale
schedule.Caption = "Regular Sale"
messfile(4).Caption = "E&xit Regular Sale"
CountQry = "Select rCount = Count( * )  From casldm, cauctm where »
» casldm.saltp between 0 and 1 and stkin not in (select stkin from »
» mfglst) AND casldm.auctn = cauctm.auctn AND SELDT>" & FTODAY
1x = QueryTheCount (hdsch, schstmt, CountQry)
ReDim FindRec(1x)
' 'mdimain.Panel3D1 = "Retrieving a total of " & Str(1x) & " records."
'CountQry = CountQry & " and stkin not in (select stkin from mfglst) »
» "

myqry = "Select casldm.seldt, casldm.seltm, casldm.unoff,  »
» casldm.CSDTD, cauctm.Saunm, casldm.auctn, casldm.saltp, casldm.stkin »
» From casldm, cauctm where casldm.saltp between 0 and 1 and stkin not »
» in (select stkin from mfglst)  AND casldm.auctn  =  cauctm.auctn AND »
» SELDT>" & FTODAY & " order by casldm.seldt , AUCNM "
'Attempt SQLPrepare(SCHSTMT, MyQry, Len(MyQry)),  "Unable to prpare »
» SQL statement 1"
```

*FIG. 8B*

```
ElseIf selectedsaletype = 1 Then  'This is manufacturer sales
    messfile(4).Caption = "E&xit Manufacturer Sale"
    schedule.Caption = "Manufacturer Sale/" & Trim(SelectedMfgrName)
    CountQry = " Select rCount =Count( * ) From casldm, cauctm where »
    » casldm.saltp = 0 and  cauctm.auctn=casldm.auctn and casldm.stkin = »
    » ' " & SelectedMfgr & " '    AND SELDT>" & FTODAY & " "
    1x = QueryTheCount (hdsch, schstmt, CountQry)
    ReDim FindRec(1x)
    'mdimain.Panel3D1 = "Retrieving a total of " & Str(1x) & " records."
    myqry = "Select  casldm.seldt, casldm.seltm, casldm,unoff, »
    » casldm.CSDTD, cauctm.saunm, casldm.auctn, casldm.saltp, casldm.stkin »
    » From casldm, cauctm where casldm.saltp = 0 and »
    » cauctm.auctn=casldm.auctn and casldm.stkin = ' " & SelectedMfgr & " ' " ,»
    » AND SELDT>" & FTODAY & " " order by casldm.seldt , AUCNM"
    'Attempt  SQLPrepare(SCHSTMT, MyQry, Len(MyQry)), "Unable to prepare  »
    » SQL statement 1"
ElseIf selectedsaletype = 2 Then  'This is Heavy duty and truck sales
    messfile(4).Caption = "E&xit Heavy Duty/Truck Sale Schedule"
```

*FIG. 8C*

ELECTRONIC ON-LINE MOTOR VEHICLE AUCTION AND INFORMATION SYSTEM

BACKGROUND OF THE INVENTION

The present invention relates generally to commercial motor vehicle auctions in which motor vehicle dealers purchase at auction pre-owned motor vehicles which have been assembled at one or more remote locations by a motor vehicle auction company. More particularly, this invention pertains to information systems and networks which allow on-line participation in the motor vehicle auction process and which provide auction participants access to auction-related data.

Motor vehicle auctions have become a popular way for motor vehicle dealers to add to their inventory of used vehicles which are sold at retail at their locations. Accordingly, several large motor vehicle auction companies sell pre-owned vehicles. The pre-owned vehicles are assembled on one or more motor vehicle auction facilities. These pre-owned vehicles are consigned by motor vehicle manufacturers, rental car companies, commercial fleet companies, financial institutions, and motor vehicle dealers. In the past, full and effective participation in a commercial motor vehicle auction has meant that a representative of the motor vehicle dealer must personally visit the motor vehicle auction site to participate in the motor vehicle auction. This, of course, adds to the expense of purchasing vehicles in the motor vehicle auction and slows the entire process down. Accordingly, some in the motor vehicle auction industry have attempted to stream-line the process by providing a way in which vehicle dealers can participate in the motor vehicle auction from remote locations, using some form of electronic on-line access to the motor vehicle auction itself.

One attempt at implementing an on-line motor vehicle auction system is described in U.S. Pat. No. 4,789,928, which was issued to Flex Japan, Inc., and Aucnet, Inc. on Dec. 6, 1988. In the system of the '928 patent, a host computer is connected to a number of "dealer terminals" through a hierarchy of "front" computers. Interactive bidding occurs over a conventional phone network so that the intermediate computers can transmit motor vehicle auction data between the motor vehicle dealer terminals and the host computer. Prior to the motor vehicle auction, laser discs storing information about the specific vehicles to be auctioned are physically delivered to the various dealer terminal locations. The dealer terminals then go on-line with the host computer to log in as an authorized user/bidder. In response to host computer commands, the dealer terminals are prompted to retrieve the data about the vehicle being auctioned. Then the bidding begins.

The Aucnet system does not address all of the needs of motor vehicle auction participants. For example, it lacks the capacity to electronically supply motor vehicle auction related information to the auction participants, such as a motor vehicle auction sale calendar, vehicle stock locator, auction market reports, industry news, and the like. Also, the architecture of the Aucnet system is hardware intensive, making it more complex to set up, operate and maintain.

What is needed, then, is an electronic motor vehicle auction system which not only allows a remote user to participate on-line in the motor vehicle auction using a personal computer, but also provides such remote users electronic access to comprehensive information about the motor vehicle auction and vehicles so that the motor vehicle auction process is facilitated. Such a system is not available in the prior art.

SUMMARY OF THE INVENTION

The electronic motor vehicle auction system of the present invention allows a motor vehicle dealer or other remote user to sign on to a host network from a personal computer. Data packets are routed to and from the users's PC workstation through a remote access server connected to a hub/router. An SQL server attached to the host network contains a relational database of auction data and responds to information queries initiated by the user.

Resident on the user's PC workstation are six primary user applications: Sale Calendar, which provides information about the dates, locations, and inventory associated with the upcoming vehicle motor vehicle auctions; Stock Locator, which assists the user in locating a particular model vehicle; Electronic Motor Vehicle Auction, which permits the user to participate in the bidding process during an Electronic Motor Vehicle Auction; Market Reports, providing historical and current sale prices for different vehicle types that have been sold at auction in the system; Industry News, offering news and information about the auto industry and trends; and Redistribution Management, in which a user can track its inventories at any or al motor vehicle auctions, as well as vehicles to be consigned for repossession, end-of-lease term, and pick up and delivery. This application can allow for file uploads and downloads to the consignor.

BRIEF DESCRIPTION OF THE DRAWINGS

FIG. 2a is a flow chart diagram illustrating the sequence of events and user options in the "Sale Calendar" application.

FIG. 6b is a flow chart diagram showing the sequence of events and user options after the user selects the "Electronic Sale Schedule" routine from the "Electronic Auction" main menu screen.

FIG. 6c is a flow chart diagram showing the sequence of events and user options after the user selects the "Sale Catalog/Inventory" display routine from the "Electronic Sale Schedule" menu screen, while in the "Electronic Auction" application.

FIG. 8 is a representative sample of SQL source code used in the Sale Calendar application of the system.

DESCRIPTION OF THE PREFERRED EMBODIMENT

System Overview

The electronic motor vehicle auction and auction information system of this invention provides interactive on-line services to remote users who may enter queries about vehicle sale information, sale schedules, auction pricing, and vehicle stock availability, and who may "bid" for vehicles electronically against other users. The system is implemented by connecting the users' personal computer (PC) workstations, via communication networks, to the system host computer network.

Hardware

Figure 1:
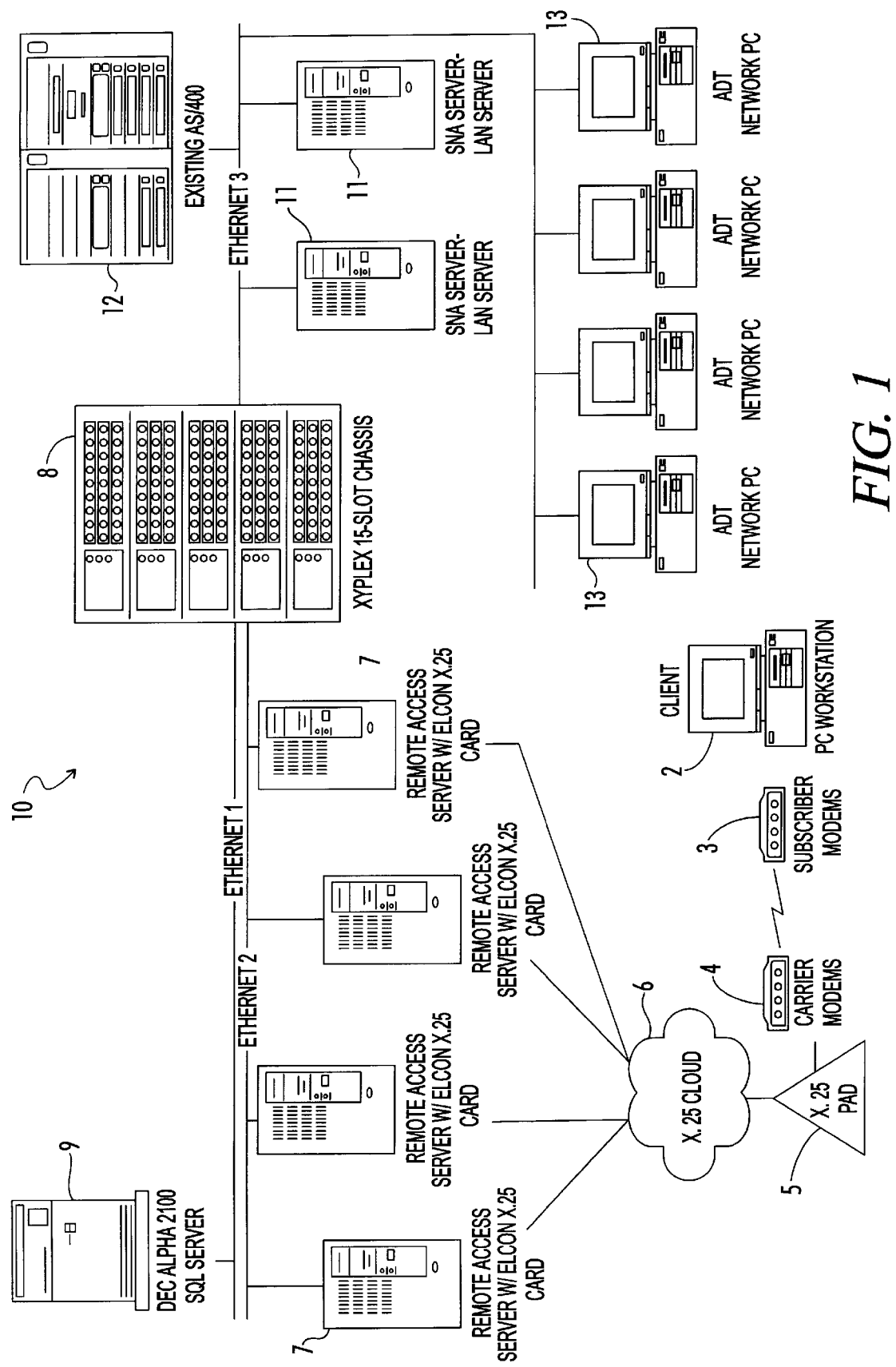
FIG. 1 is a schematic drawing showing the architecture of the remotely accessed computer network used to implement the system of the present invention.

A preferred architecture for the hardware of the system network 10 is shown on FIG. 1. Each user stores the software necessary to run the various user applications (described below) on their local PC workstations 2. A preferred configuration for a user PC workstation 2 is a 486 IBM compatible processor, with 8 megabytes of random access memory (RAM) running on Windows for Workgroups 3.11 or Windows 95, and a 14.4 kbps modem.

All communications parameters are incorporated within the user applications. Preferably, the user applications are written to function in a Microsoft Windows environment. Accordingly, the user will select the auction system icon from the Microsoft Windows for Workgroups 3.11 or Windows 95 Program Menu. The user's PC workstation then attempts to make a network connection to the system host network using asynchronous communications through a conventional user modem 3, connected via carrier modems 4 and leased communication lines 6, using standard communications security and authentication measures. The leased communications lines 6 can be part of an industry standard X.25 protocol communications cloud, controlled by a common carrier.

A data packet assemble/dissembler (PAD) 5, and one or more remote access servers (RAS) 7 (which also include a PAD) provide a means to interconnect the host network to the user workstations 2 and efficiently communicate the packets of data. The remote access servers 7 make the workstations 2 appear to the host network as if they were physically attached.

When opening the system software from Windows, the user must provide a User Number and Password. The system software then automatically dials the host network. Once connected to the host network, security management services are extended to the remote users. The host network system uses an environmental system that authenticates the User Number and Password and allows the user to access the network, subject to the user's user privileges. The subsystem requires a User Number and Password from each user. If the password is entered incorrectly, the user is denied access. In addition, each user can have a certain set of specific user privileges controlling the level of access to the system resources—files, directories, drive, networks, modems, etc. These "privileges" are assigned to the user by the network administrator.

The network of the present system is further enhanced by the use of a network hub/router 8. The hub/router 8 combines the functions of a local smart bridge/router and a concentrator management processor. Unlike a network repeater, which replicates electrical signals, a local hub/router replicates network data packets. The local hub/router physically separates the remote access server 7 from the host network devices. The host network devices can include a structured query language (SQL) server 9 and conventional local area network (LAN) hardware, including a LAN server 11, minicomputer 12, and LAN workstations 13. A type 9000 network hub from Xyplex can be used as a hub/router 8.

A relational database, containing the various categories of motor vehicle auction data described below, is resident on the SQL server 9. In order to query the SQL server 9, the user software must first know the Destination Address of the SQL server 9 which is provided by the host system software. The local hub/router 8 reads the Destination Address (typically a 48 bit field embedded within a data packet) of the network data packet arriving from the remote access server 7 and determines if this is a valid Destination Address for this network. If valid, it delivers the packet to the appropriate host network device. If invalid, the hub/router 8 returns the packet with an "Undeliverable" message to the source address, i.e., the user workstation 2. The hub/router 8 will not deliver network data packets unless it has the appropriate Destination Address corresponding to the host network.

The SQL server 9 uses structured query language to allow all the user applications to access the relational databases resident on the server 9. An Alpha 2100 AXP computer from Digital Equipment, running Microsoft SQLServer operating software, can be used.

Once communications are established and security measures are passed, the only network activity that occurs are data queries from the user and responses from host network.

Software

In a preferred embodiment of the system 10, the user applications are developed and coded in a manner well known to those skilled in the art, using event-driven program language, which indicates that program directions are executed based on the activity of a user action (event) such as a key press, or mouse click. Because Windows programming is based on an "event driven" environment, there is no defined flow of program. In event driven applications, all programming is based on defining the response to the event. Consequently, the drawing figures which illustrate program flow for the various applications of the system are not intended to show traditional program logic. Rather, the flow charts assume that the user makes specific selections, then describe an overall flow of what takes place when certain events are triggered.

To begin using the on-line motor vehicle auction and information system, the user activates his or her workstation 2 in a conventional manner until the system icon is displayed on the Program Manager screen or Program Menu. After clicking on the system icon, the sign-on screen will appear. At this point, the user must enter his user number and password which has been assigned by the system administrator. The system will then dial the host network.

When the host network accepts the user's call and recognizes the user, the system main menu screen will appear. The system main menu screen will include icons or command buttons which correspond to the six primary user applications, along with a Help and Exit button. Also, if the user has any messages sent by the system operator, a "Message Manager" dialog box will appear on the screen, asking the user if he wishes to read messages at that time. The Message Manager dialog box can also pop up at any time during which the user is logged on to the host network. When the Message Manager dialog box is displayed, the user can accept and read the messages, or defer reading them until later.

In any event, after log-on to the system by attaching to the host network, the user will then select a command button corresponding to one of the six primary user applications. These are described in more detail below.

Sale Calendar

Figure 2B:
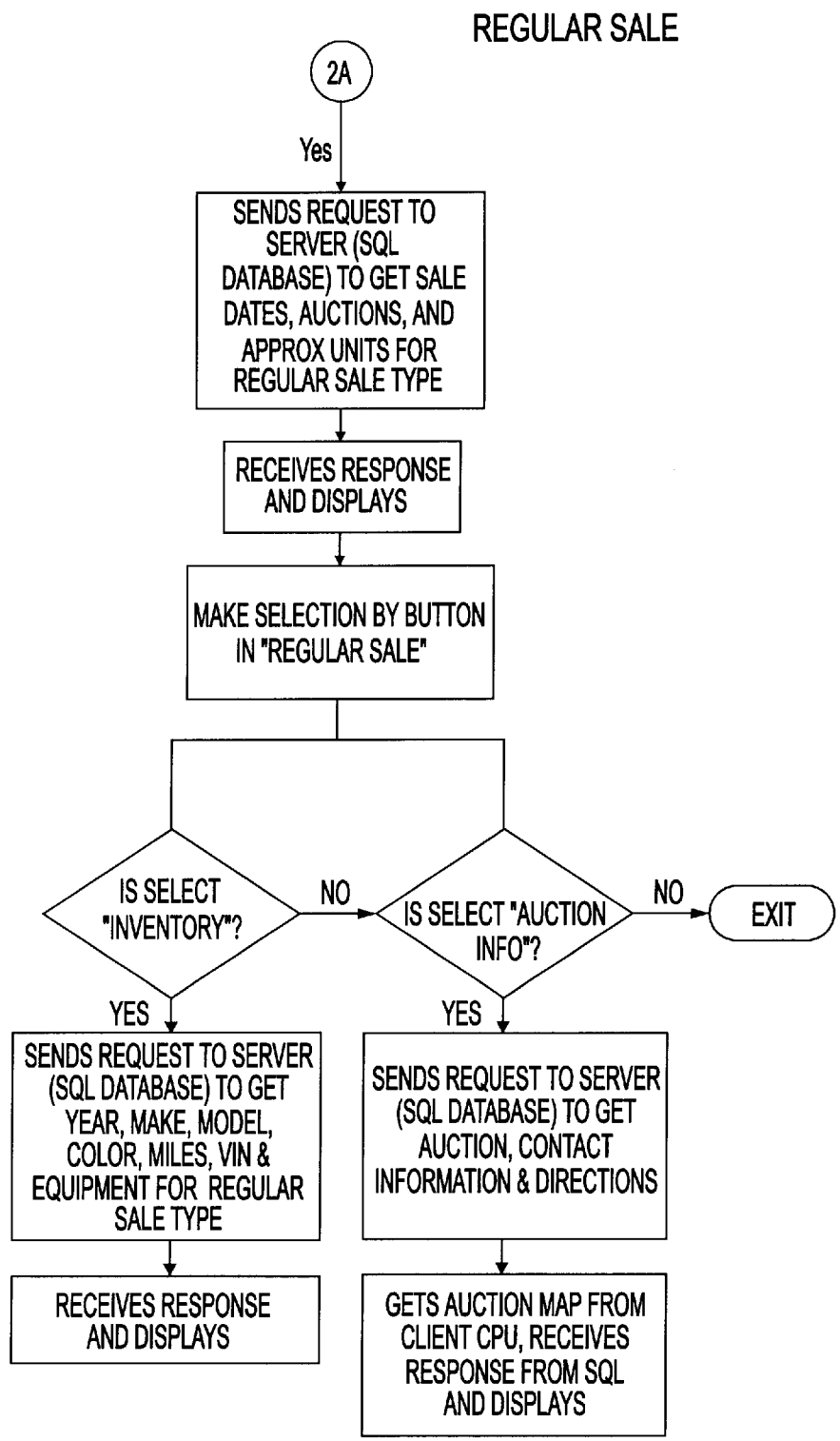
FIG. 2b is a flow chart diagram showing the sequence of events and user options after the user has selected the "Regular Sale" type from the "Sale Calendar" main menu screen.

As described on FIG. 2a, the Sale Calendar application allows the user to view and print sale (motor vehicle auction) dates and sale locations. The inventory to be sold at each listed motor vehicle auction is also available through this application, including a brief description of the vehicles and equipment information for each of the vehicles. Within the Sale Calendar application, the user has the option of selecting certain types of motor vehicle auction sales, including Regular Sale (FIG. 2b), representing fleet/lease and consignment sales information for all motor vehicle auction locations. The sale information available includes the date and time of the sale, the number of vehicles to be sold, the location of the motor vehicle auction, and the sale type. Contact persons, phone numbers, and directions to the motor vehicle auction are also available including a directional map.

Figure 2C:
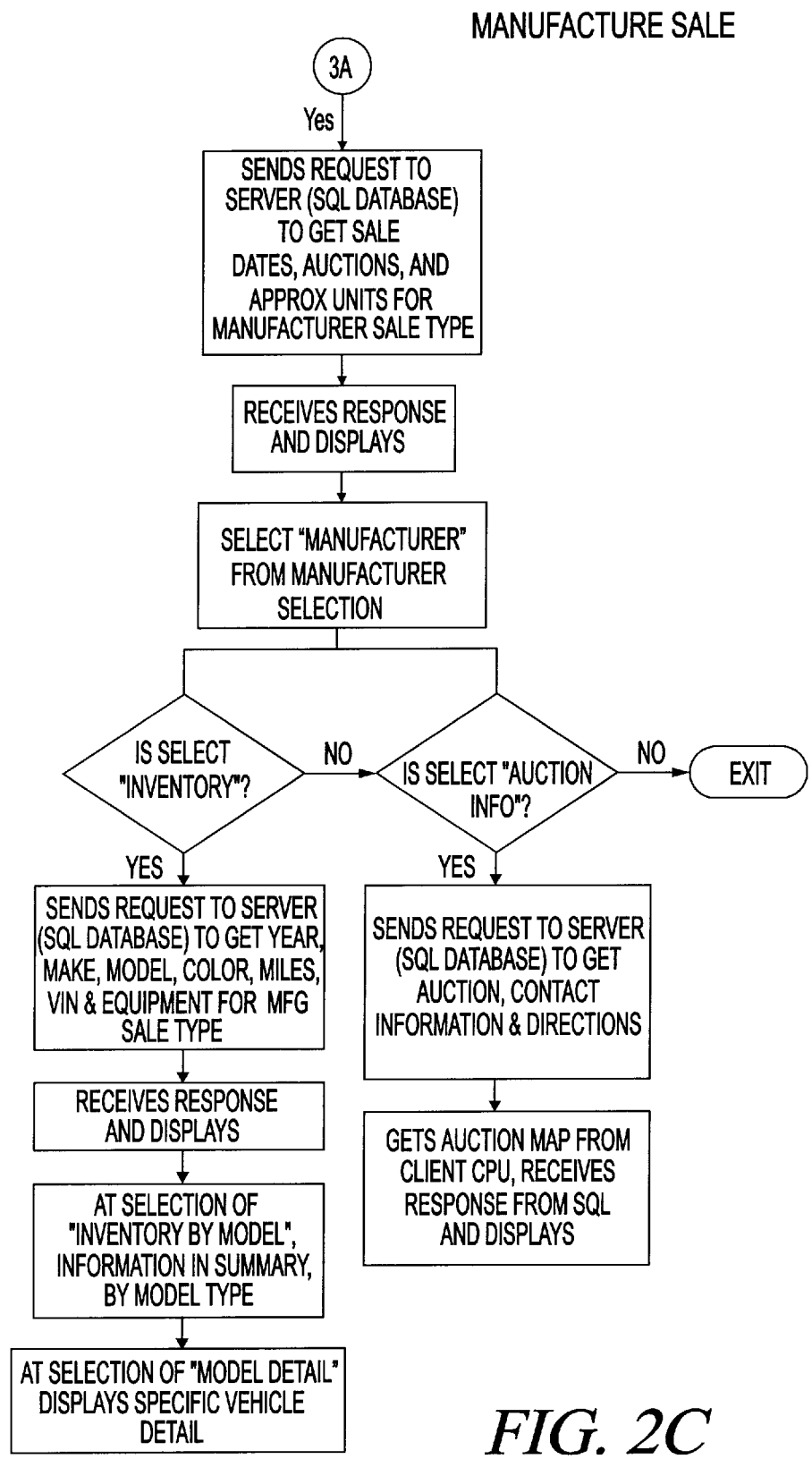
FIG. 2c is a flow chart diagram showing the sequence of events and user options after the user has selected the "Manufacturer Sale" type from the "Sale Calendar" main menu screen.

A second command button or option available to the user in the Sale Calendar application is Manufacturer Sale (FIG. 2c). This routine allows the user to obtain and display manufacturer sale information for all motor vehicle auction locations, including the date and time of the sale, the number of vehicles to be sold, and vehicle inventory information corresponding to each manufacturer sale. As an initial step after entering the Manufacturer Sale routine, a manufacturer selection screen will appear. After selecting the desired manufacturer, a listing of the motor vehicle auction locations and sale dates corresponding to that manufacturer will be displayed.

Inventory information is also available (corresponding to that motor vehicle auction location or manufacturer sale), including vehicle run number, stock number, exterior color, mileage, number of doors, year, make, model, and equipment for each vehicle. Inventory by model can also be searched and displayed in this routine.

Figure 2D:
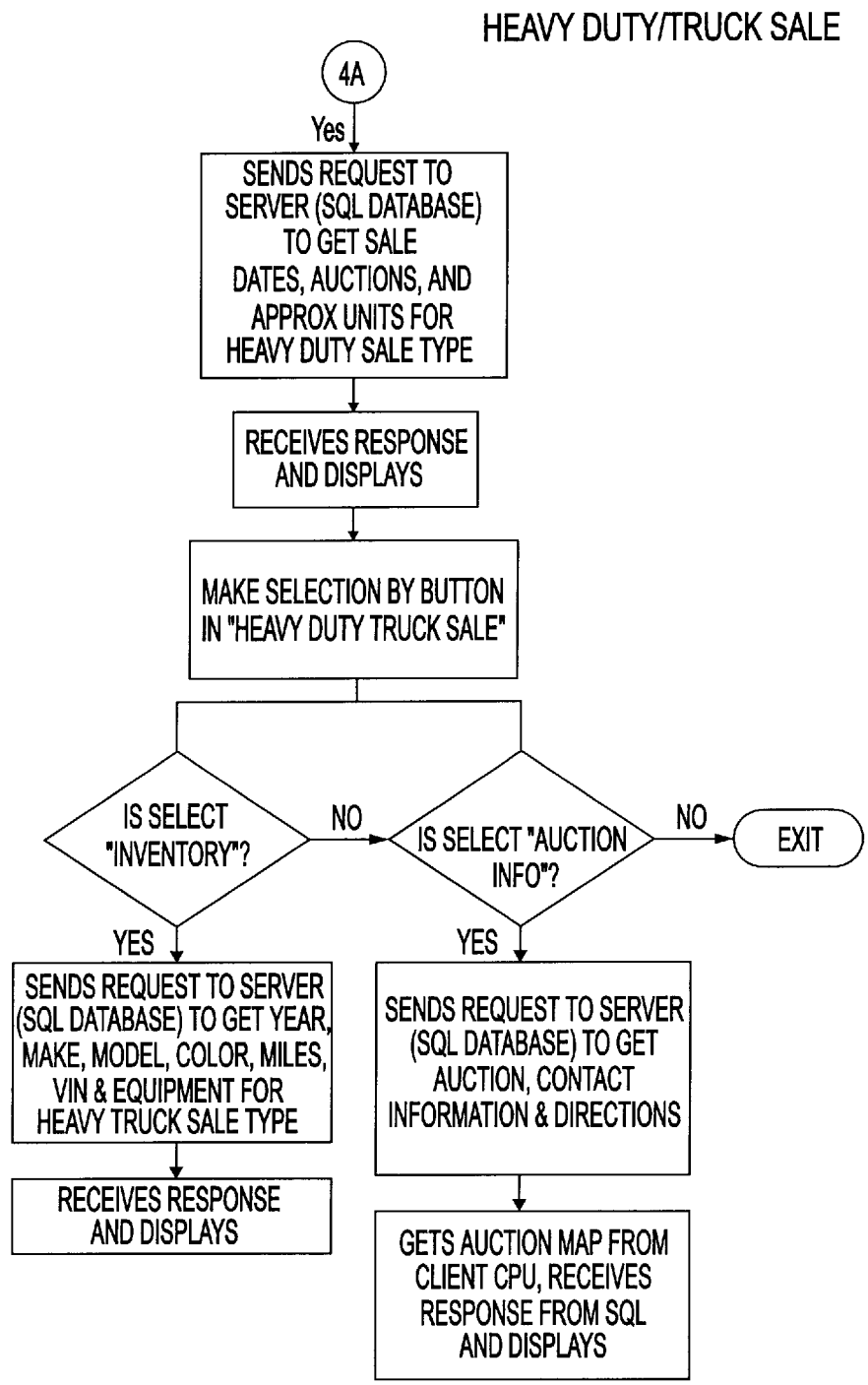
FIG. 2d is a flow chart diagram showing the sequence of events and user options after the user has selected the "Heavy Duty/Truck Sale" type from the "Sale Calendar" main menu screen.
Figure 2E:
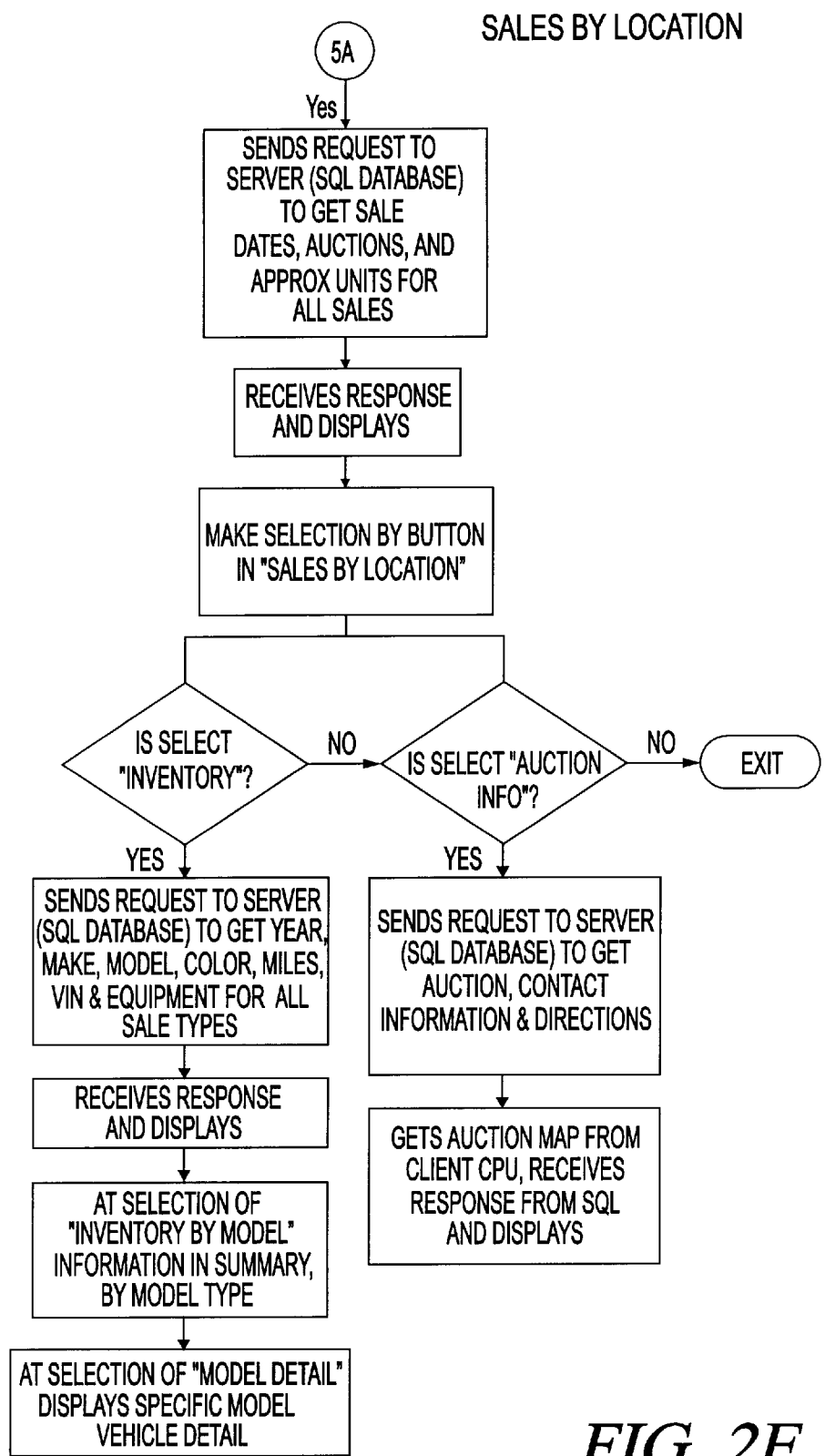
FIG. 2e is a flow chart diagram showing the sequence of events and user options after the user has selected the "Sales by Location" routine from the "Sale Calendar" main menu screen.

A third option or command button available to the user in the Sale Calendar application is Heavy Duty/Truck Sale (FIG. 2d). This routine allows the user to obtain sales information at all motor vehicle auction locations for heavy duty trucks and equipment. Again, the information available includes the date and time of the sale, the number of units to be sold, motor vehicle auction location, and the sale type. In addition, information about the motor vehicle auction (address, phone number, contact person, and directions) can be accessed.

Finally, a fourth option or command button available to the user in the Sale Calendar application is Sales by Location. This routine allows the user to obtain sale information pertaining to a particular motor vehicle auction location selected by the user. Date and time of sale, number of units, consignor, and inventory information is available. The Sales by Location screen graphically displays a map, with indications on the map as to the available locations which can be selected and searched by the user.

In each case where a particular routine or option is selected by a user, the system responds by sending a query to the SQL Server 9. The queried information is returned to the user PC workstation 2 where it is displayed and/or printed.

FIGS. 2b–2e illustrate the program flow assuming the user has made specific selections in a specific sequence.

Sale Calendar Program Flow

For each user application associated with the system, the basic flow of the user applications described and shown in the corresponding flow charts will be sufficient to enable one skilled in Windows and SQL programming to easily create source code which will implement the application. For example, the program flow for the Sale Calendar application can be characterized as follows:

```
Select Regular Sale
   - Close Sale Calendar form
   - Open Schedule form
   - Query database for items that meet Regular sale criteria
      - Display items that meet Regular sale criteria
         - Select Exit
            - Unload Regular Sale
            - Load Sale Calendar
Select Heavy Duty/Truck Sale
   - Close Sale Calendar form
   - Open Schedule form
   - Query database for items that meet Heavy Duty/Truck sale criteria
      - Display items that meet Heavy Duty/Truck sale criteria
         - Select Exit
            - Unload Heavy Duty/Truck Sale
            - Load Sale Calendar
Select Manufacturer Sale
   - Close Sale Calendar form
   - Query table for available manufacturers and logo bitmaps
   - Open Manufacturer Select form
      - Display command buttons for manufacturer and bitmaps
         - Select Manufacturer command button
            - Close Manufacturer Select form
            - Query table for sales for specified manufacturer
            - Display Schedule form
            - Display items that meet Manufacturer sale criteria
               - Select exit
                  - Unload Manufacturer sale
                  - Load Sale Calendar
Select Sale by Location
   - Close Sale Calendar form
   - Query table for available locations and label location on map
   - Open Sale Locator form
      - Display command buttons for OK and Exit
      - Display label for each location
         - Click on location label
         - Select OK
            - Close Sales Location form
            - Query table for sales for specified location
            - Display Schedule form
            - Display items that meet locations sale criteria
               - Select Exit
                  - Unload Sale by Location sale
                  - Load Sale Calendar
Select Help
   - Open help for Sale Calendar
Select Exit
   - Unload Sale Calendar and return to previous menu
```

This fundamental program flow technique can be adapted for each application.

FIG. 8 contains SQL source code for a part of the Sale Calendar application. The sample code is provided for the purpose of illustrating how the program logic of FIGS. 2–7 can be implemented using programming techniques that are well known in the art. The same techniques can be easily adapted to the other user applications.

Stock Locator

If the user wants to search for specific vehicles, he chooses the Stock Locator application. The search can be nationwide or limited to one motor vehicle auction location. In addition, by selecting the Custom Locator feature within this application, the user can create and store frequently used vehicle searches by motor vehicle auction location, make, model, and year.

Figure 3A:
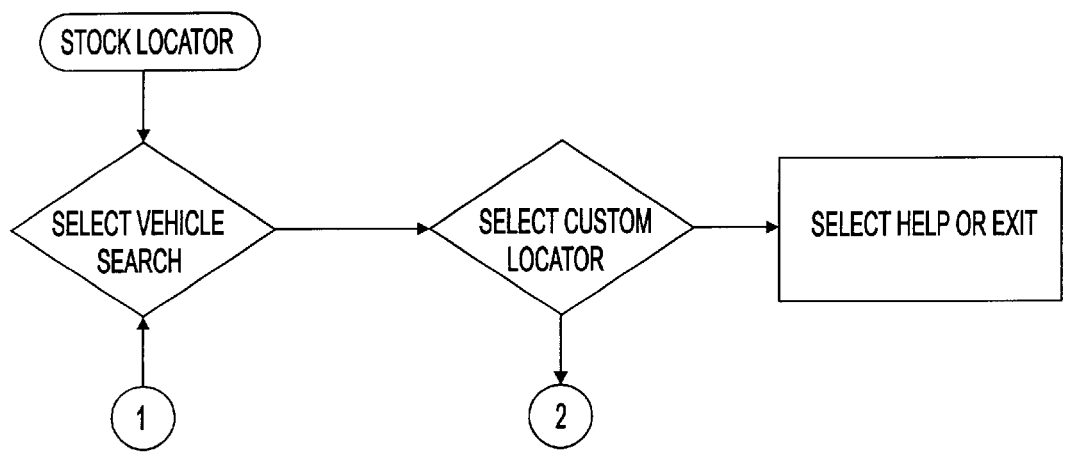
FIG. 3a is a flow chart diagram showing the initial sequence of events and user options after a user of the system has selected the "Stock Locator" application from the system main menu screen.
Figure 3B:
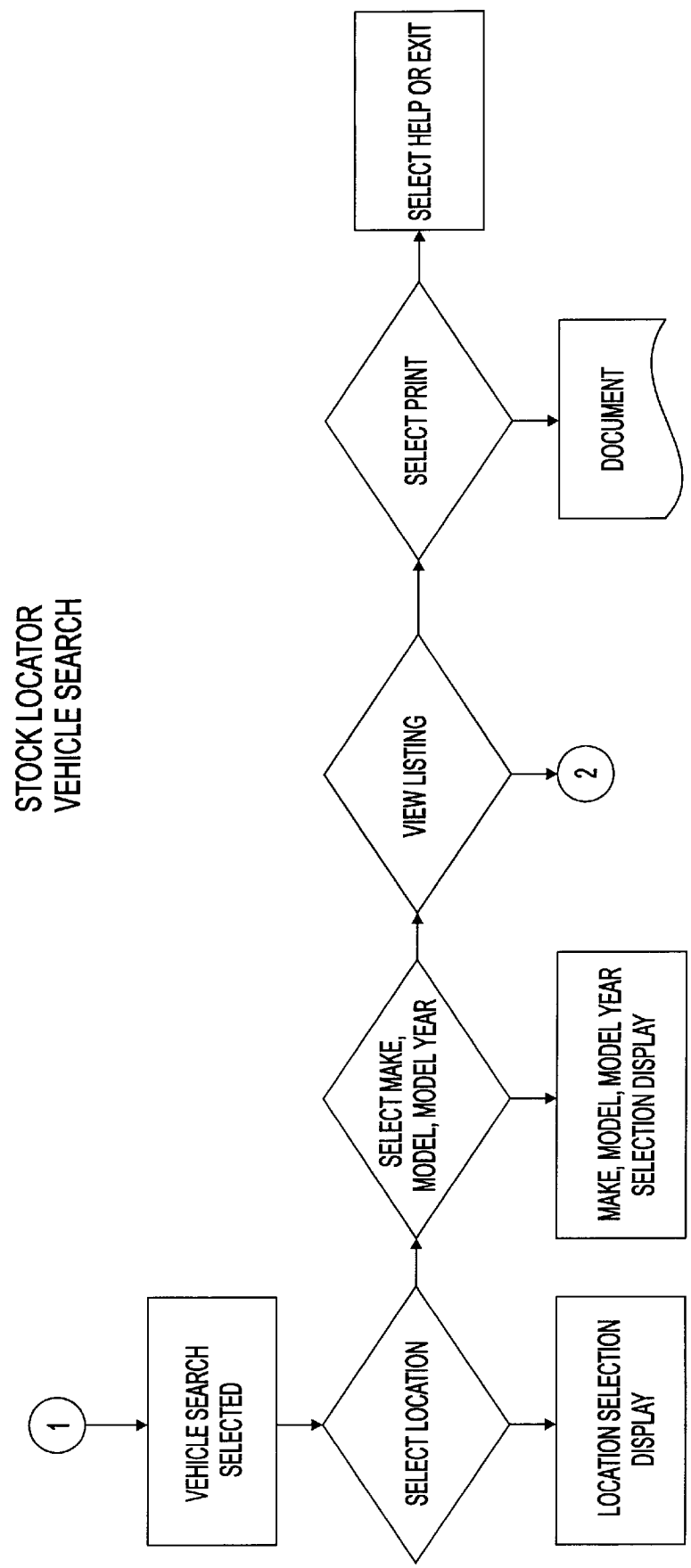
FIG. 3b is a flow chart diagram showing the sequence of events and user options after the user selects the "Vehicle Search" routine from the "Stock Locator" main menu screen.

Thus, when the user selects the Stock Locator application command button at the system main menu screen, the Stock Locator main screen will appear. The user has two options in this application, Vehicle Search and Custom Locator (FIG. 3a). If the Vehicle Search command button is clicked on (FIG. 3b), multiple search screens will appear so that the user may select from pre-defined menus of make, model, and year of vehicles. Single or multiple vehicle types can be selected. Following selection of the vehicles to be located, a listing of vehicles corresponding to the search criteria will appear, along with motor vehicle auction information associated with those vehicles.

Figure 3C:
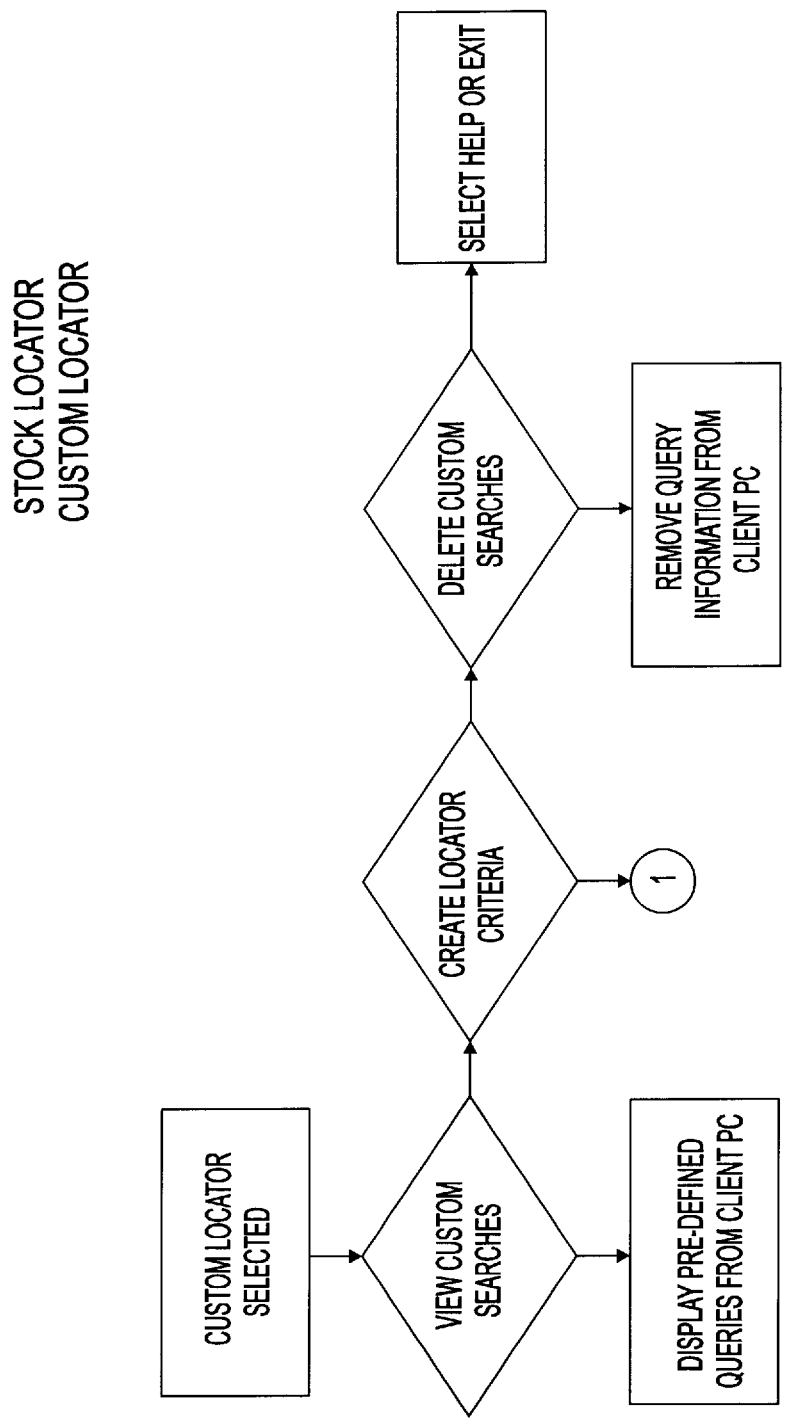
FIG. 3c is a flow chart diagram showing the sequence of events and user options after the user has selected the "Custom Locator" routine from the "Stock Locator" main menu screen.

If the Custom Locator command button is activated, the Custom Locator main screen will appear (FIG. 3c). If the View Custom Searches command button is activated, a list of previously created custom searches can be viewed and selected from. Alternatively, if the Create Locator Criteria command button is activated, the user can create a new set of locator criteria, including motor vehicle auction locations and single or multiple vehicle types. The search criteria entered can be saved for future searches. Again, if the vehicles are found through a Custom Locator search, motor vehicle auction information including directions, addresses, phone numbers, and contact persons can be displayed and printed.

Figure 3D:
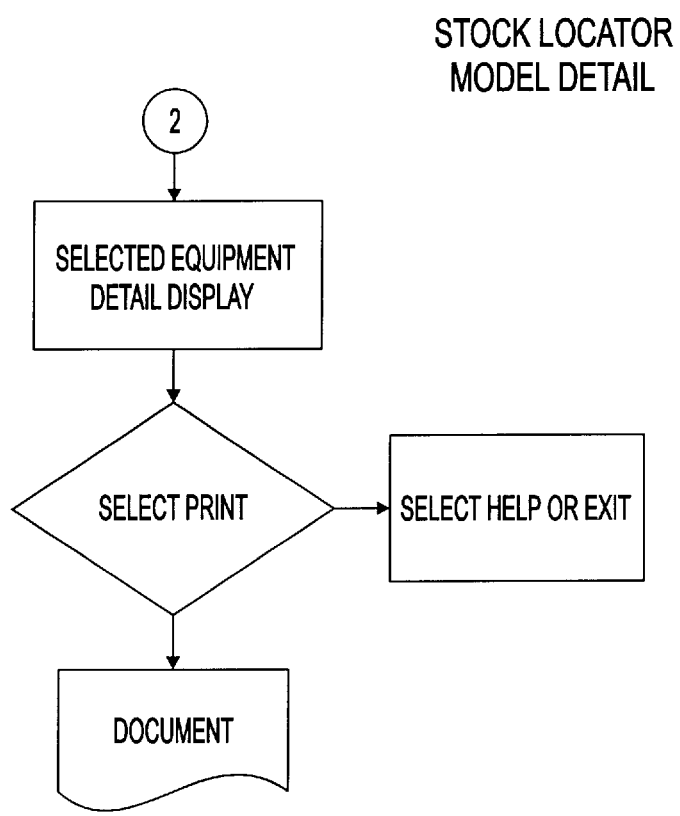
FIG. 3d is a flow chart diagram showing the sequence of events and user options after the user has chosen to display equipment detail after a vehicle has been located using either the "Vehicle Search" or "Custom Locator" routines as selected from the "Stock Locator" main menu screen.

From either the Vehicle Search or Custom Locator routines, additional details about located vehicles are available by activating the Equipment Detail command function (FIG. 3d).

Market Reports

The Market Reports application provides to the user recent vehicle sale prices for a specific motor vehicle auction location or by geographic region.

Figure 4A:
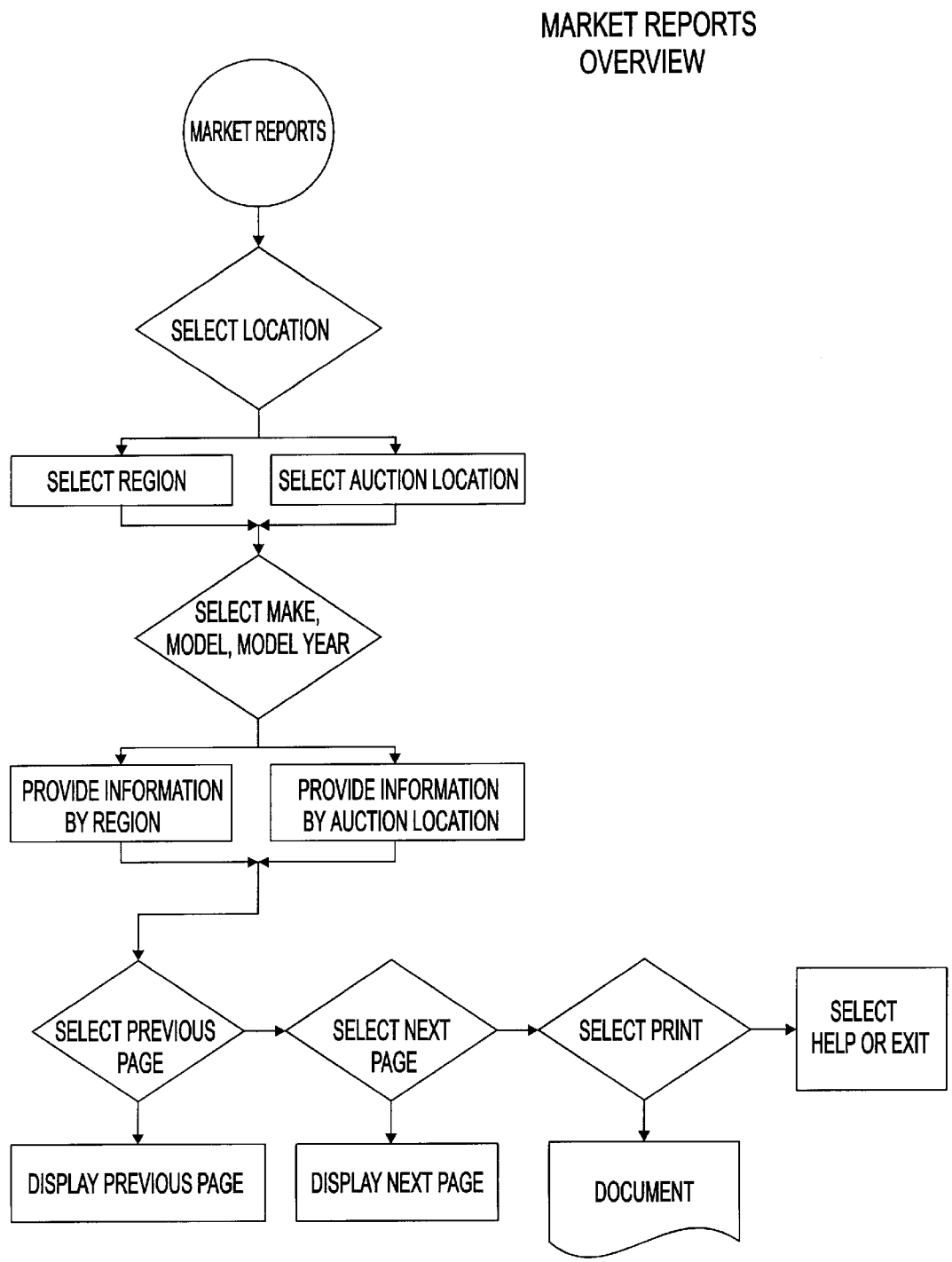
FIG. 4a is a flow chart diagram showing the sequence of events and user options after the user selects the "Market Reports" application from the system main menu screen.
Figure 4B:
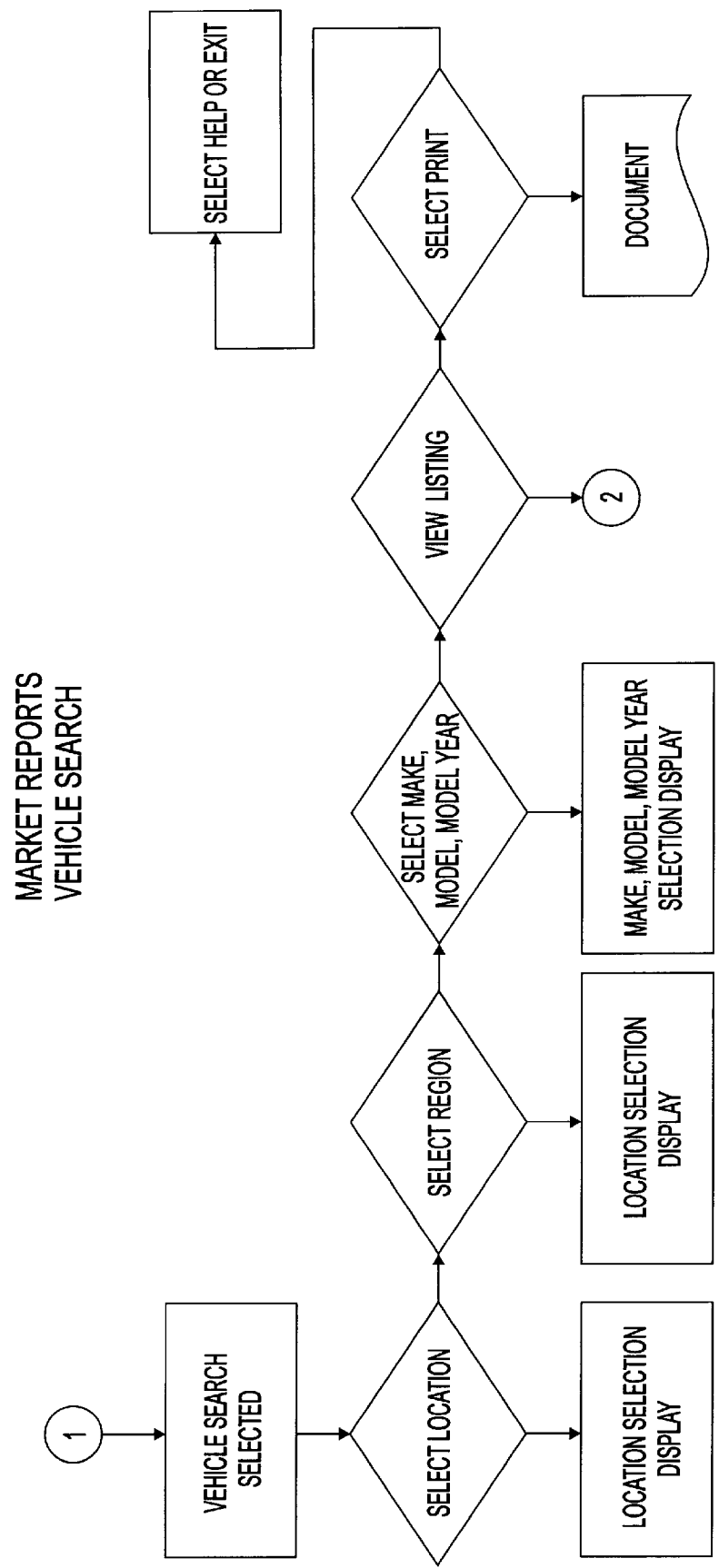
FIG. 4b is a flow chart diagram showing the sequence of events and user options after the user selects the "Vehicle Search" routine from the "Market Reports" application main menu screen.
Figure 4C:
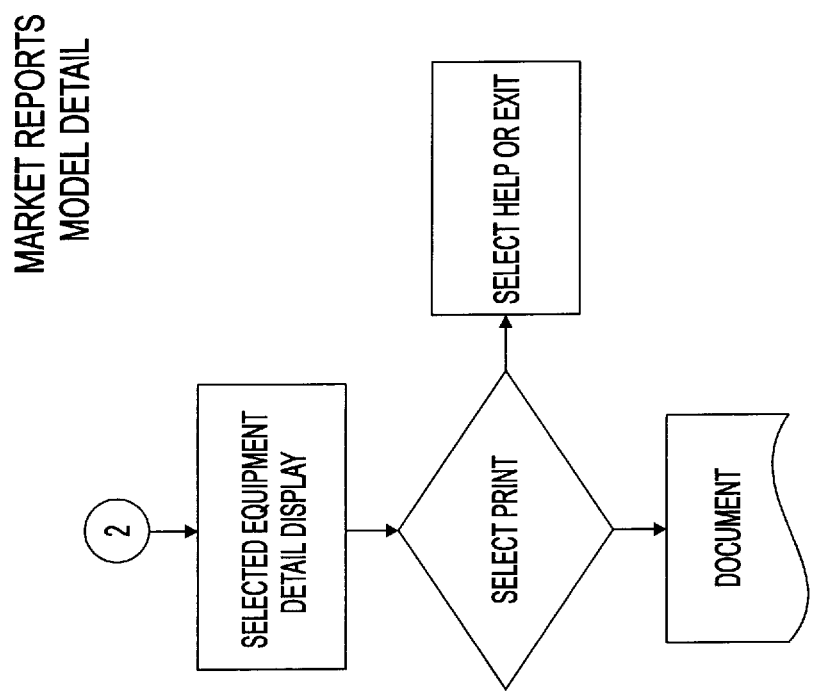
FIG. 4c is a flow chart diagram showing the sequence of events and user options after the user selects the "Equipment Detail" routine from the "Market Reports" application main menu screen.
Figure 5:
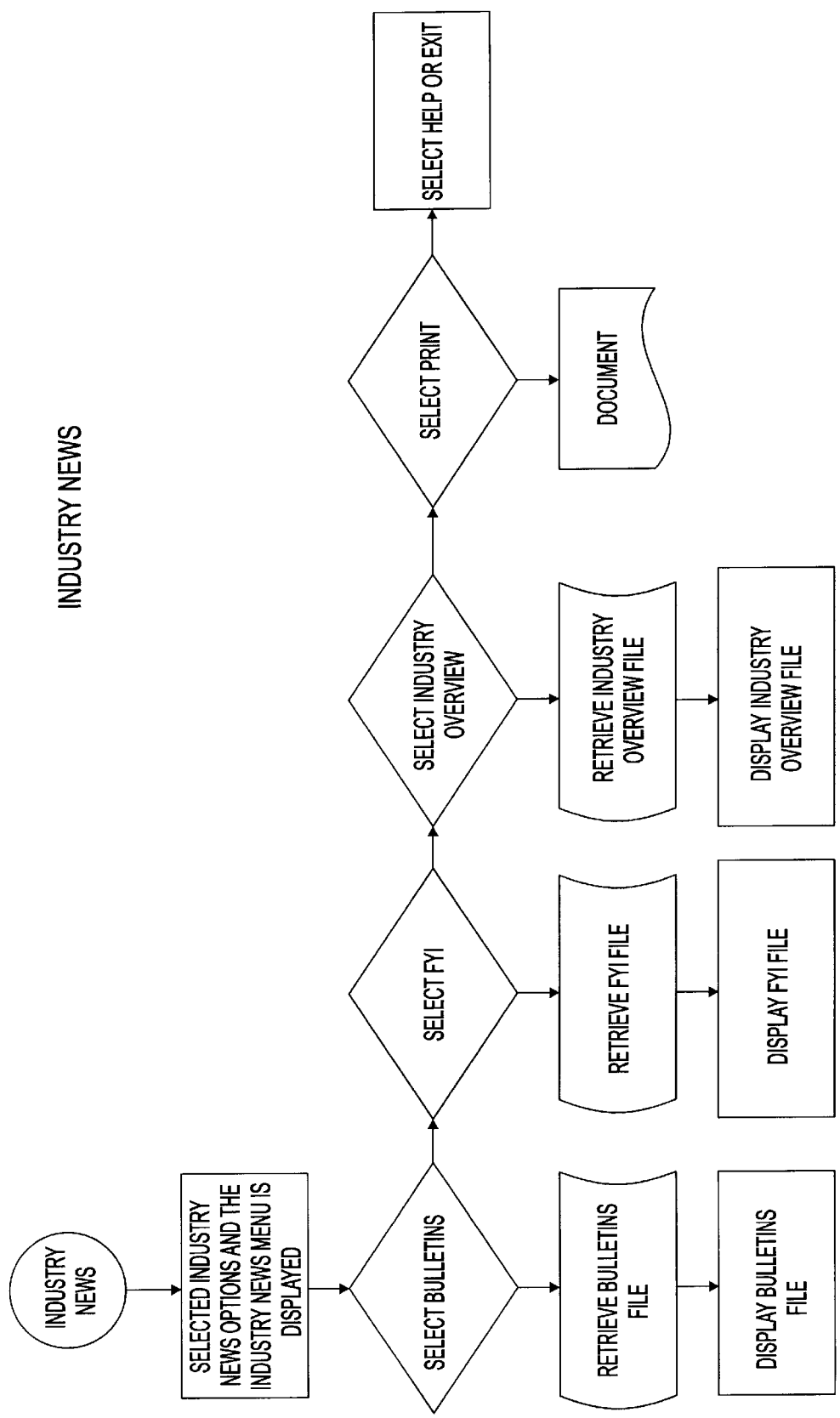
FIG. 5 is a flow chart diagram showing the sequence of events and user options after the user has selected the "Industry News" application from the system main menu screen.

When the Market Reports application main menu appears, the user is given the option of obtaining market information by location (FIG. 4a). If the Select Location command button is chosen, a map displaying the various motor vehicle auction regions and locations appears. The user can then select a region by choosing a desired colored area on the map, or a particular motor vehicle auction location by clicking on the name of the specific motor vehicle auction location. Then, individual search screens corresponding to vehicle make, model, and year will appear so that user can select the type of vehicle for which market information is needed (FIG. 4b).

If more detail is needed about a vehicle identified to the user in the Market Reports application, the Equipment Detail routine (FIG. 4c) can be used, as described above.

Industry News

The Industry News application (FIG. 5) provides information about the automobile industry, including recent events, headlines, and marketplace trends. When the Industry News main menu appears, the user is given a choice of selecting Bulletins, which offers weekly highlights about the automobile industry; an FYI command button, for display of current automotive trends; and an Industry Overview routine for display of annual summary and forecast information.

Electronic Auction

Figure 6A:
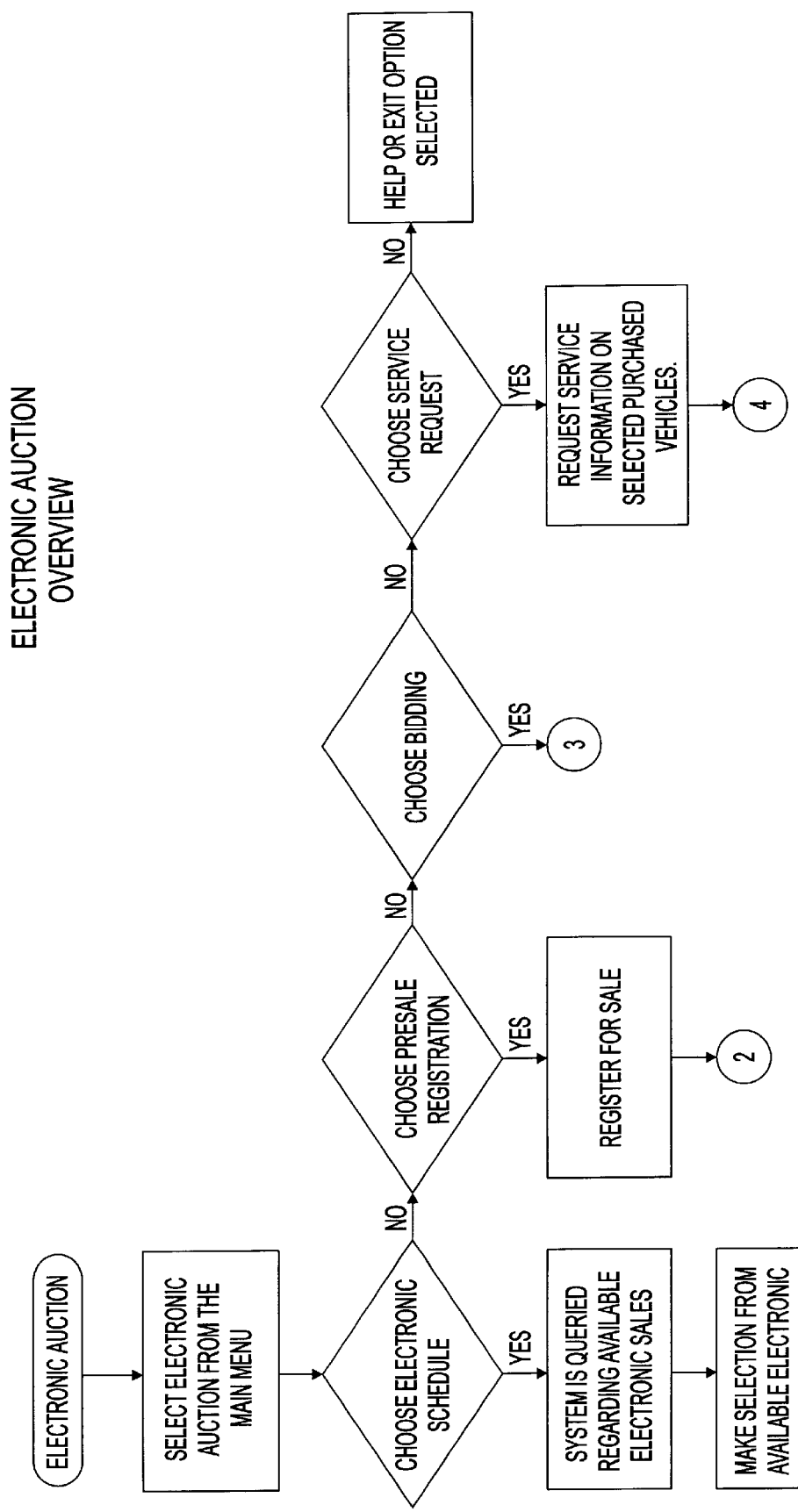
FIG. 6a is a flow chart diagram showing the sequence of events and user options after the user has selected the "Electronic Auction" application from the system main menu screen.

The Electronic Auction application enables the user to preview sale inventory associated with a specific motor vehicle auction, to register as a bidder for a sale, to bid electronically during the sale, and to electronically deliver vehicle transportation service requests (FIG. 6a).

The Electronic Auction main menu screen provides command buttons for "Electronic Sale Schedule", which allows the user to receive a listing of sale dates, time, and vehicle consignors (FIG. 6b). After the user selects a sale date from the Electronic Sale Schedule menu, the inventory or "sale catalog" associated with that sale will be displayed, either in total, or by model (FIG. 6c).

Figure 6D:
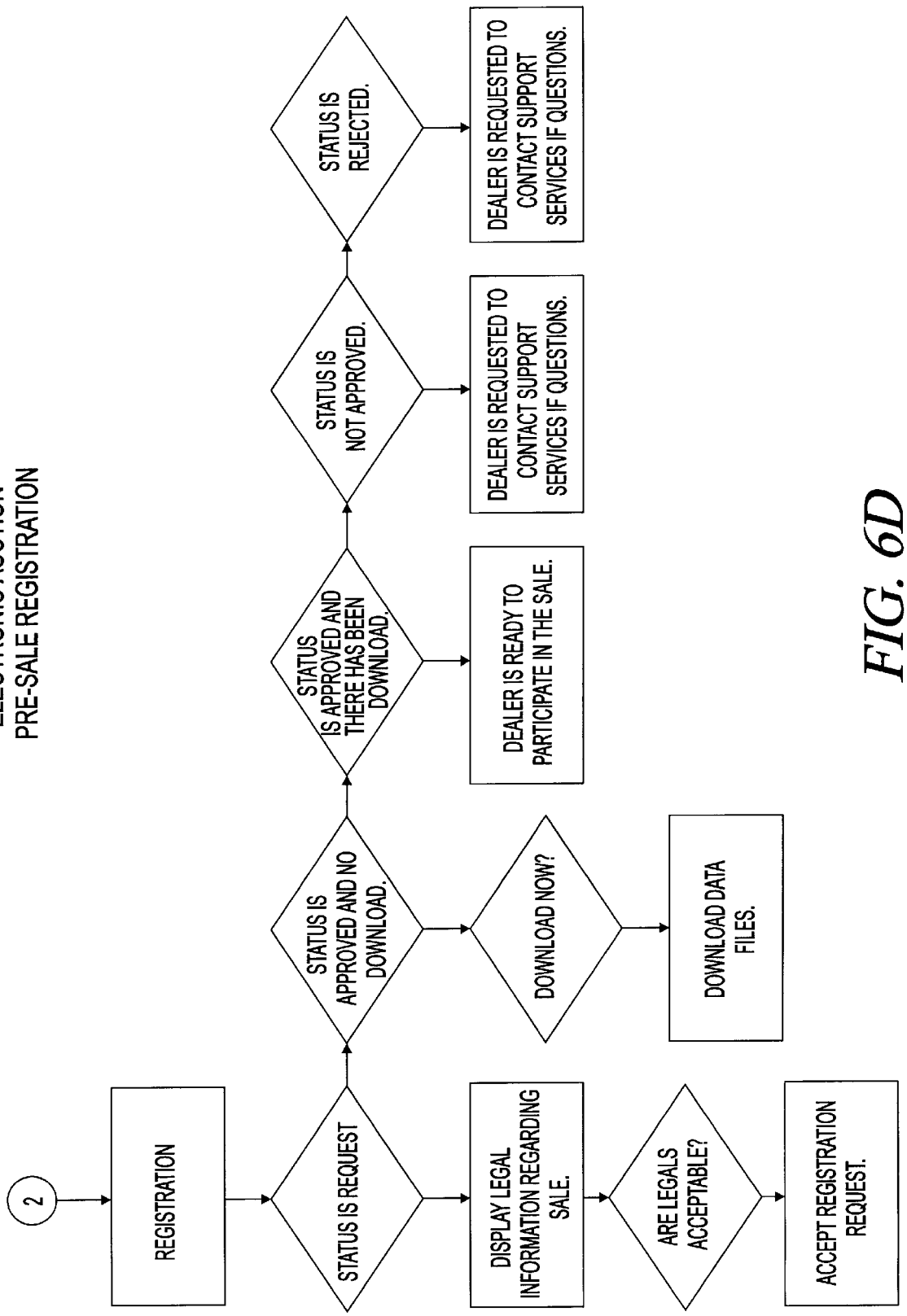
FIG. 6d is a flow chart diagram showing the sequence of events and user options after the user selects the "Pre-Sale Registration" routine from the "Electronic Auction" main menu screen.

The user can initiate an on-line Pre-Sale Registration routine as described in FIG. 6d. At the Pre-Sale Registration main menu, clicking on the Register for Sale button permits user selection of a certain sale date to register for. The application then prompts the user for any changes to be made in the method of primary payment for any vehicles to be purchased at the motor vehicle auction. Then, the user must accept the rules, terms, and conditions associated with the sale.

Finally, a message window will appear confirming that the user has registered for a specific sale.

Prior to the actual motor vehicle auction sale date, the user receives, by on-line file down load, or by diskette, the sale information and the PIN number previously assigned. This information needs to be imported into the PC workstation 2 at the user's location so that the user can review the actual sale inventory prior to bidding at the sale. Thus, the registration screen in the Electronic Auction application will prompt the user to load the sale disk.

Figure 6E:
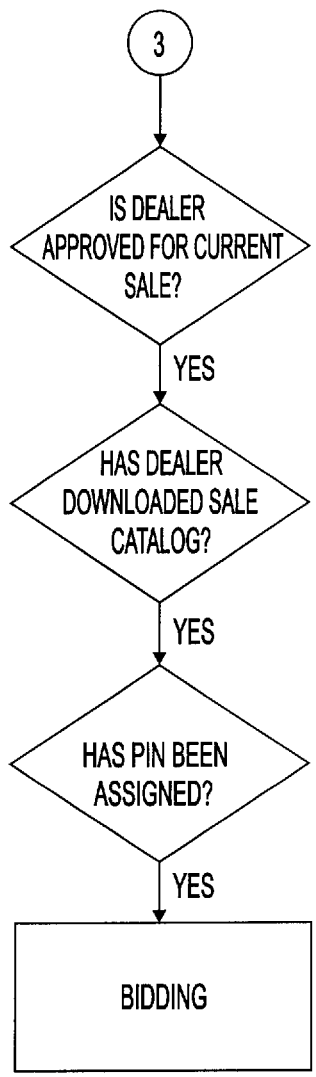
FIG. 6e is a flow chart diagram showing the sequence of events and user options if the user selects the "Bidding Process" routine from the "Electronic Auction" main menu screen.
Figure 6F:
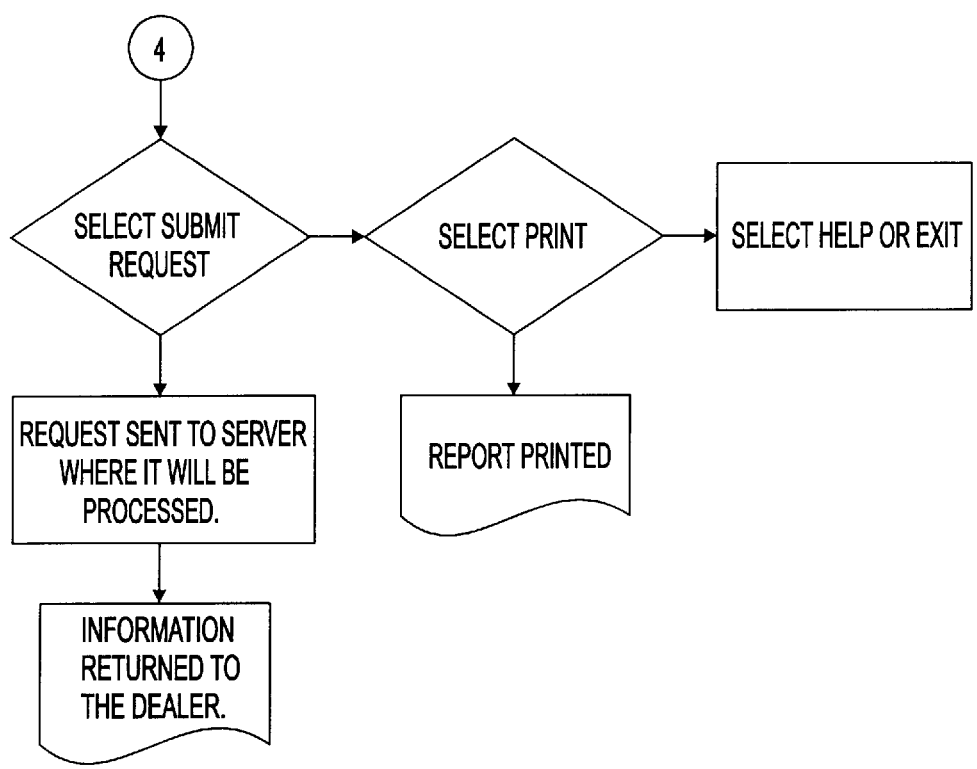
FIG. 6f is a flow chart diagram showing the sequence of events and user options if the user selects the "Service Request" routine from the "Electronic Auction" main menu screen.

Another important routine within the Electronic Auction application is the actual Bidding Process (FIG. 6e). This allows the user to bid for vehicles on the specified sale date. To begin the Bidding Process, the user clicks on the Activate Bidding command button at the Electronic Auction Menu. At that time, the application will prompt the user for the PIN number corresponding to the day of sale. The bidding main screen then appears, with the notification of the start time of the motor vehicle auction. When the motor vehicle auction actually begins, the bid screen will appear. The bid screen includes an image and information about the vehicle being auctioned including vehicle run number, mileage, descriptive information, vehicle ID number, and condition and grade information. The bid screen also displays updated information as to the asking price, current bid price, the current bid number, and the previous bid number applicable to that vehicle. Finally, the bid screen keeps track of the units purchased during that motor vehicle auction by the user, and the dollar amount committed to purchases by the user during the sale.

During the sale, and while the bid screen is being displayed, a "start bidding" message will appear on the user's screen. At that point, the user may click on the bid command button to place a bid for the vehicle. The bid status section of the screen will then display "bidding" to confirm that a bid was entered from the user's workstation to the host network. When the user's bid is accepted, a message "you are current bidder" will appear in the status section of the bid screen. While the user is the current bidder, the user is not permitted to exit the sale or access on-line help.

As an aid to the bidder, the bidding screen will display a "check mark" in the message section to indicate that the particular vehicle being sold was previously flagged for interest by the user during review of the sale catalog prior to the sale date.

When the bidding closes, a message "going, going, sold" will appear on the bid screen and, if that particular user is the winning bid, a winning bid "ribbon" will be displayed in the message section.

The user may exit the bidding process at any time when that user is not the current bidder.

The Electronic Auction application has a Service Request routine (FIG. 6f) which enables the user to arrange for transportation of vehicles purchased in an Electronic Auction sale. Thus, after a purchase is made, the user can select from the Electronic Auction main menu screen the Service Request command button to arrange for transportation. The next screen will display a listing of sale dates that the user participated in. The user then selects a date from the list, after which a list of vehicles corresponding to that sale date are posted along with transportation fees. The user then clicks on the vehicles in the list which are to be transported.

A Purchase Summary feature allows the user to obtain information, including year, make, model, sale price, buyer, and other fees, corresponding to vehicles that have been purchased in an Electronic Auction. Again, when selecting the Purchase Summary command button from the Electronic Auction main menu, the display will list the sale dates that the user participated in. Upon clicking on a particular sale date, a list of sale information corresponding to that motor vehicle auction and associated with that user will be displayed. After reviewing this information, the user may return to the Electronic Auction menu or may click on the Activate Bidding command button to return to the bidding process if applicable.

Finally, while in the Electronic Auction application, the user may view and print all information about a selected Electronic Auction sale, by selecting the Sale Catalog review button. A list of sale dates will appear and the user can select a desired sale date. Then, the View Catalog command button can be activated to display sale inventory associated with that selected motor vehicle auction. Included in the Sale Catalog information is a summary of the vehicle inventory, including condition grade, and an electronic vehicle image which can be viewed and/or printed. During the Sale Catalog review, the user can mark for interest, i.e., flag, any particular vehicle that the user is interested in bidding on. As mentioned above, these flags will then be displayed during the bidding process.

Redistribution Management

The final application available to the user in the system is Redistribution Management. This feature enables the user to assign, track, and review his or her respective vehicle consignment and sale activity for all motor vehicle auctions linked to the system. From the initial Redistribution Management menu screen (FIG. 7a), the user is given a choice of Create Search or Transfer Information routines.

Figure 7A:
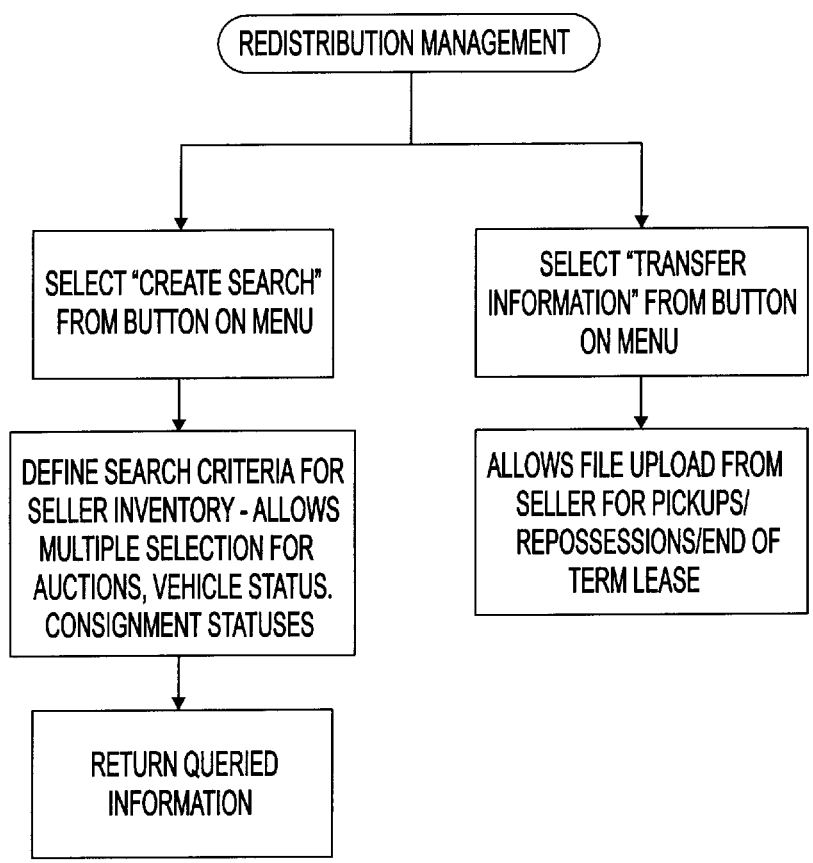
FIG. 7a is a flow chart diagram showing the sequence of events and user options if the user selects the "Redistribution Management" application from the system main menu screen.
Figure 7B:
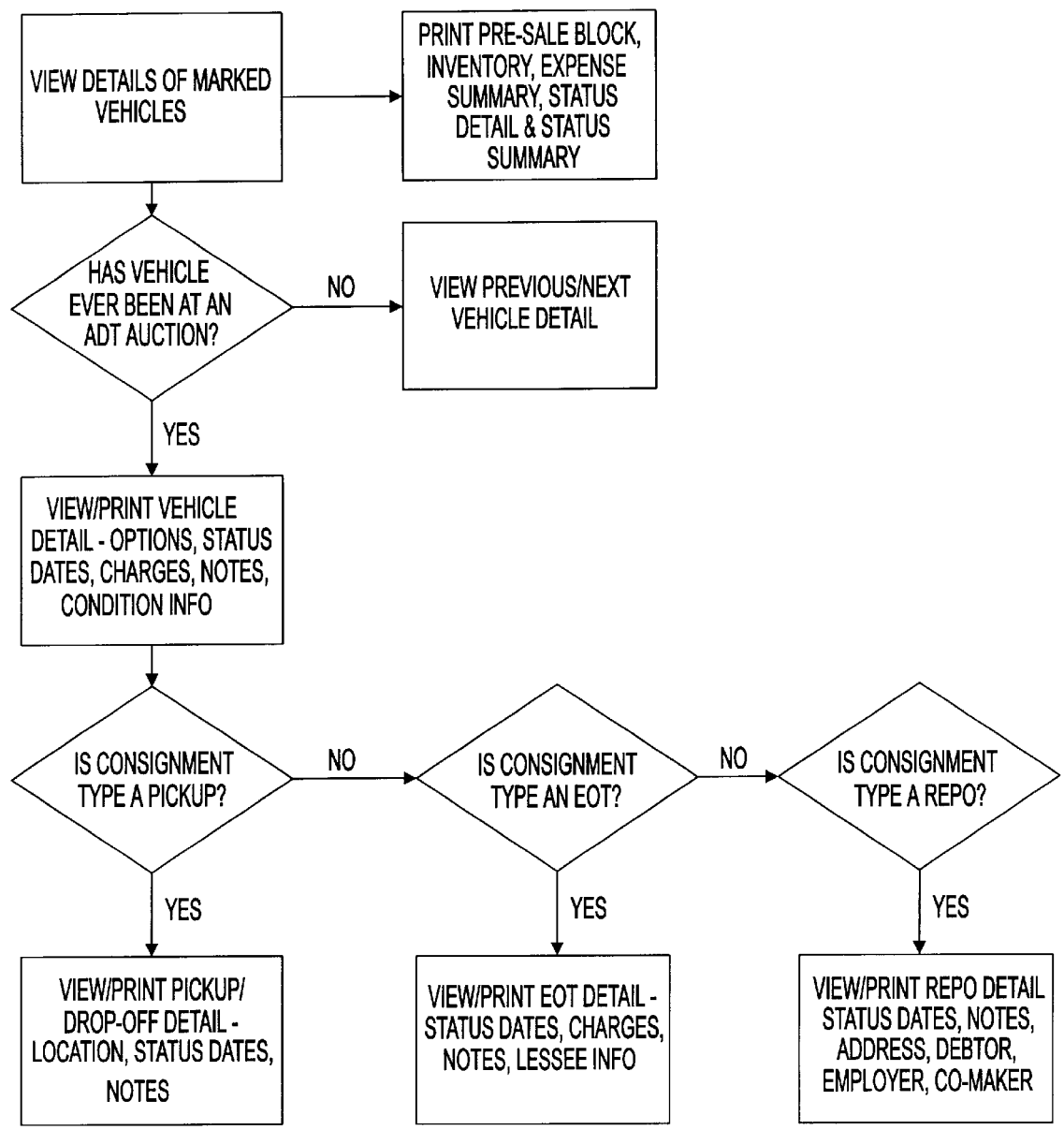
FIG. 7b is a flow chart diagram showing the sequence of events and user options if the user selects the "View Vehicle Detail" routine after the user has searched for and marked certain vehicles from an inquiry entered in the "Create Search" menu screen.

In the Create Search routine, the user defines the criteria for searching the user's inventory. The search criteria includes motor vehicle auction date/location, vehicle status (year/make/model/VIN), and consignment account status. At the conclusion of the search, the user may view a variety of information about each consigned vehicle, as seen in FIG. 7b.

Figure 7C:
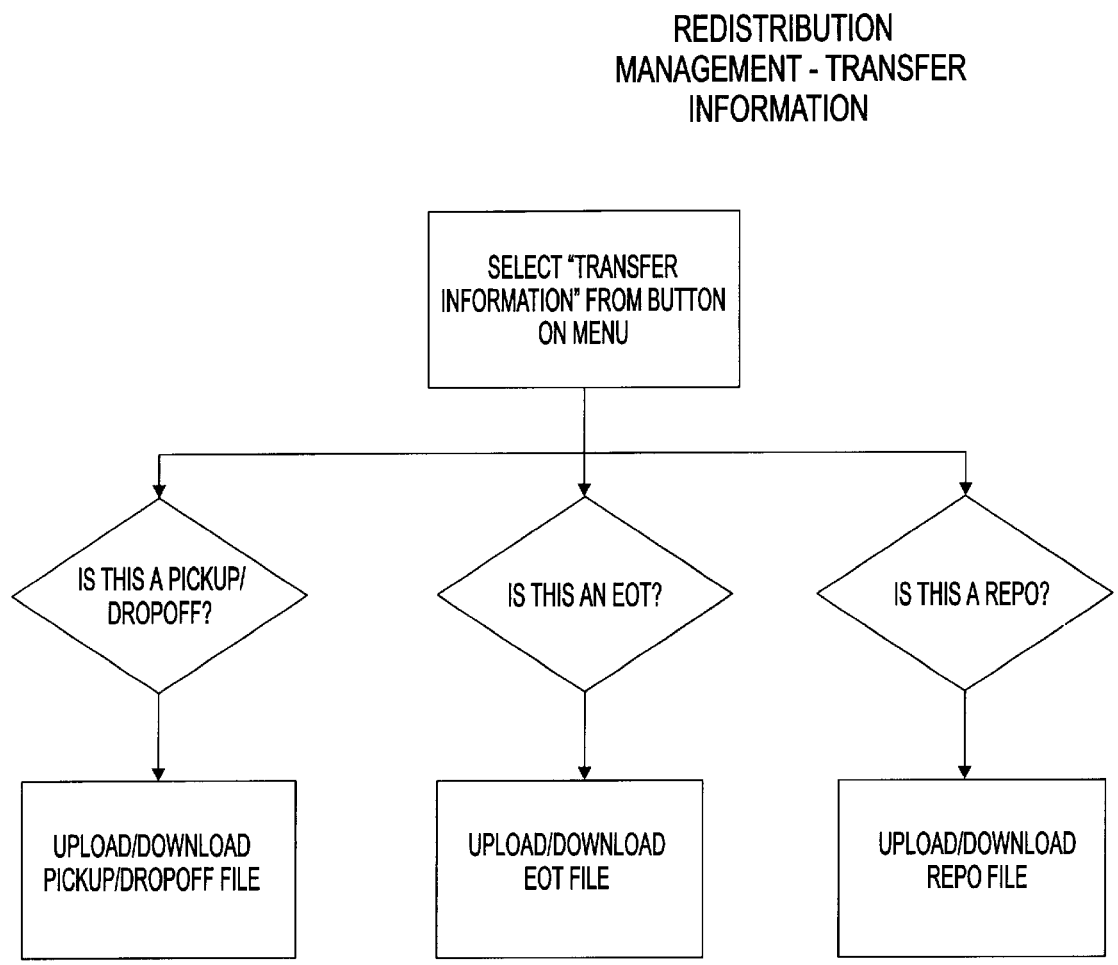
FIG. 7c is a flow chart diagram showing the sequence of events and user presented options if the user selects the "Transfer Information" routine from the "Redistribution Management" main menu screen.

The second command option available in the Redistribution Management application is Transfer Information, as shown on FIG. 7c. In this routine, the user can send and receive to and from the motor vehicle auction company various files: pick-up/drop-off notices; end of term files; and repossession notices.

Thus, although there have been described particular embodiments of the present invention of a new and useful electronic on-line motor vehicle auction and information system, it is not intended that such references be construed as limitations upon the scope of this invention except as set forth in the following claims.

What we claim is:

1. A system for electronic exchange of vehicle auction information between remote users and an auction service provider comprising:

a. a host computer network, the host computer network including a database server that electronically stores and organizes auction data and that retrieves and transmits selected portions of the auction data in response to user commands;

b. computer workstations placed at locations associated with each user, the computer workstations including a video monitor, means to send user commands to the host computer network, and means to receive and display on the video monitor auction data retrieved and transmitted from the host computer network;

c. a communications network electronically linking the computer workstations to the host computer network;

d. a set of user application modules which cause the computer workstations and host computer network to generate on the video monitors a series of command options selectable by the user to generate the user commands, whereby the selected portions of the auction data stored on the host computer network are located, organized, and transmitted over the communications network to a workstation in response to one or more particular user commands and are displayed on the video monitors;

e. the auction data including information about the geographic location and date of auctions and about an inventory of vehicles available for sale at each of the auctions, and the set of user application modules includes a sale calendar module which allows the user to search the auction data and to display on the video monitors at the workstations a list of one or more auctions by date, by location, and by vehicle sale type; and f. an electronic auction module associated with the workstations and host computer network whereby users may electronically place bids for vehicles being sold at an auction.

2. The system of claim 1 wherein the set of user application modules includes a stock locator module which allows the user to search the auction data for one or more specific vehicle types and display the search results at the workstations.

3. The system of claim 2 wherein the stock locator module includes a custom vehicle locator routine to allow the user to create and store custom vehicle search criteria.

4. The system of claim 1 wherein the auction data includes historical sales information about previous auction sales and the set of user application modules includes a market reports routine whereby the user can search the auction data and display at the workstations the historical auction data.

5. The system of claim 1 wherein the auction data includes news and trends information in the motor vehicle industry and the set of user application modules includes an industry news routine whereby the user can search the auction data and display at the workstations the news and trends information.

6. The system of claim 1 wherein the auction data includes vehicle detail information, including vehicle condition grade and an electronic image of the vehicles being sold at the auctions, and the set of user application modules includes a sale catalog review routine whereby the user can search the auction data and display the vehicle detail information.

7. The system of claim 6 wherein the sale catalog review routine includes a mark for interest routine to allow the user to mark one or more vehicles for future reference while the user is reviewing the vehicle detail information.

8. The system of claim 7 wherein the electronic auction module includes a vehicle detail review routine whereby the user can review the vehicle detail information during an auction, including any marks associated with the vehicles placed by the user during the mark for interest routine.

9. The system of claim 1 wherein the electronic auction module includes a service request routine to allow the user to make an on-line request for transportation of vehicles purchased by the user during an electronic auction.

10. The system of claim 1 wherein the auction data includes seller activity data associated with users, including information about vehicles consigned by the user for sale and the status of the user's consignment and sales account, and wherein the set of user application modules includes a redistribution management routine whereby the user can search the auction data and sort and display the seller activity associated with that user.

* * * * *